United States Patent
Fletcher et al.

(10) Patent No.: US 7,103,392 B2
(45) Date of Patent: Sep. 5, 2006

(54) WIRELESS INTERCOM SYSTEM

(75) Inventors: Douglas D. Fletcher, Canton, MI (US); James C. Medek, Shoreview, MN (US); Ronald W. Hall, South Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 606 days.

(21) Appl. No.: 10/050,308

(22) Filed: Jan. 15, 2002

(65) Prior Publication Data

US 2003/0134666 A1 Jul. 17, 2003

(51) Int. Cl.
*H04B 1/38* (2006.01)

(52) U.S. Cl. .................... 455/569.1; 455/550.1; 455/416; 379/159; D14/159

(58) Field of Classification Search ............... 455/463, 455/3.05, 3.03, 569.1, 550.1, 416, 550, 557.2, 455/554, 544.1, 554.2, 555, 556.1, 556.2; 379/159, 160, 167.01, 174, 167.02, 167.03, 379/167.04, 167.14, 167.15; D14/159, 147, D14/142, 149, 150, 155
See application file for complete search history.

(56) References Cited

U.S. PATENT DOCUMENTS

| | | | |
|---|---|---|---|
| 299,288 A | 5/1884 | Stewart | |
| 303,553 A | 8/1884 | Barnard | |
| 1,182,896 A | 5/1916 | Davison | |
| 1,699,127 A | 1/1929 | Wacker | |
| 2,486,267 A | 10/1949 | Dulinsky | |
| 3,031,537 A | 4/1962 | Rose | |
| 3,101,155 A | 8/1963 | Lehr et al. | |
| 3,167,619 A | 1/1965 | Palmaer | |
| 3,306,991 A | 2/1967 | Wood | |
| 3,461,463 A | 8/1969 | Beguin | |

(Continued)

FOREIGN PATENT DOCUMENTS

CH 244196 3/1947

(Continued)

OTHER PUBLICATIONS

"Ultraplex™ System" brochure, *Panasonic*, 2 pages (believed to have been on sale before Jan. 15, 2001).

(Continued)

*Primary Examiner*—Nay Maung
*Assistant Examiner*—Angelica M. Perez
(74) *Attorney, Agent, or Firm*—Stephen W. Buckingham

(57) ABSTRACT

A wireless intercom unit includes an electronics housing including a first side, where the first side is configured to interface with a planar surface. The intercom unit also includes a microphone, a speaker, and an input device, where these components are located on a portion of the housing other than the first side. The intercom further includes a first channel transceiver for a first channel radio frequency range. In another embodiment, a wireless communication system includes a wireless intercom unit and an earpiece for wireless communication with the wireless intercom unit. In yet another embodiment of the invention, a wireless communication system includes a wireless intercom unit and a remote switch for providing user input information to the intercom unit.

11 Claims, 22 Drawing Sheets

U.S. PATENT DOCUMENTS

| | | |
|---|---|---|
| 3,769,095 A | 10/1973 | Schmidt |
| 3,906,160 A | 9/1975 | Nakamura et al. |
| 3,977,907 A | 8/1976 | Roth et al. |
| 4,027,113 A | 5/1977 | Matsumoto et al. |
| 4,117,203 A | 9/1978 | Sjogren |
| 4,125,681 A | 11/1978 | Sjogren |
| 4,278,852 A | 7/1981 | Gorike |
| 4,323,156 A | 4/1982 | Grueneberg |
| D264,961 S | 6/1982 | Oxenreider |
| 4,409,442 A | 10/1983 | Kamimura |
| 4,431,717 A | 2/1984 | Kikuchi |
| 4,482,745 A | 11/1984 | Maulding |
| 4,484,029 A | 11/1984 | Kenney |
| 4,517,413 A * | 5/1985 | Pavitt, Jr. ............... 379/110.01 |
| 4,591,661 A | 5/1986 | Benedetto et al. |
| 4,741,030 A | 4/1988 | Wilson |
| 4,754,230 A | 6/1988 | Schwartz |
| D298,029 S | 10/1988 | Foster |
| 4,815,143 A | 3/1989 | Derhaag |
| 4,882,745 A | 11/1989 | Silver |
| 4,882,770 A | 11/1989 | Miyahira |
| 4,904,549 A | 2/1990 | Goodwin et al. |
| 4,930,148 A | 5/1990 | Lee |
| 4,977,610 A | 12/1990 | Kutz |
| 5,027,433 A | 6/1991 | Menadier et al. |
| 5,033,094 A | 7/1991 | Hung |
| 5,060,308 A | 10/1991 | Bieback |
| D321,500 S | 11/1991 | Fukuda |
| D321,680 S | 11/1991 | Blount et al. |
| 5,113,428 A * | 5/1992 | Fitzgerald ................ 455/575.2 |
| 5,117,464 A | 5/1992 | Jones et al. |
| 5,117,465 A | 5/1992 | MacDonald |
| 5,121,243 A | 6/1992 | Miyahira |
| 5,185,807 A | 2/1993 | Bergin et al. |
| 5,189,400 A | 2/1993 | Schultz |
| 5,203,017 A * | 4/1993 | Brooks ....................... 455/507 |
| 5,212,020 A | 5/1993 | Inobe |
| 5,220,677 A | 6/1993 | Brooks |
| 5,247,380 A | 9/1993 | Lee et al. |
| 5,253,095 A | 10/1993 | Menadier |
| D342,947 S | 1/1994 | Totsuka |
| 5,295,191 A | 3/1994 | Van Vroenhoven |
| 5,305,132 A | 4/1994 | Fasen |
| 5,321,848 A | 6/1994 | Miyahira et al. |
| 5,333,206 A | 7/1994 | Koss |
| 5,347,387 A | 9/1994 | Rice |
| 5,402,497 A * | 3/1995 | Nishimoto et al. ........... 381/95 |
| 5,405,716 A | 4/1995 | Yoshimatsu et al. |
| D358,126 S | 5/1995 | Sakuma et al. |
| D364,417 S | 11/1995 | Winston |
| 5,491,839 A | 2/1996 | Schotz |
| 5,508,123 A | 4/1996 | Fan |
| 5,512,891 A | 4/1996 | Kang |
| 5,530,763 A | 6/1996 | Aebi et al. |
| D371,784 S * | 7/1996 | Gertz ....................... D14/159 |
| 5,548,623 A | 8/1996 | Casper et al. |
| 5,590,407 A | 12/1996 | Ishikawa et al. |
| 5,590,417 A | 12/1996 | Rydbeck |
| D377,477 S | 1/1997 | Harata et al. |
| 5,608,612 A | 3/1997 | Hokao |
| 5,621,384 A | 4/1997 | Crimmins et al. |
| 5,621,662 A | 4/1997 | Humphries et al. |
| 5,644,630 A | 7/1997 | Durco, Jr. |
| 5,673,036 A | 9/1997 | Gabrielle |
| D387,328 S | 12/1997 | Ueda |
| 5,701,356 A | 12/1997 | Stanford |
| 5,710,979 A | 1/1998 | Tamai |
| D390,187 S | 2/1998 | Urvoy |
| 5,721,775 A | 2/1998 | Leifer |
| D393,624 S | 4/1998 | Shim |
| D394,436 S | 5/1998 | Hall et al. |
| 5,784,471 A | 7/1998 | Bebenroth |
| 5,784,685 A | 7/1998 | Stanford et al. |
| 5,794,127 A | 8/1998 | Lansang |
| 5,798,931 A | 8/1998 | Kaehler |
| D399,819 S | 10/1998 | Iida |
| D400,160 S | 10/1998 | Nagano |
| 5,582,300 A | 10/1998 | Addy et al. |
| 5,825,896 A | 10/1998 | Leedom |
| 5,828,300 A | 10/1998 | Addy et al. |
| D400,494 S | 11/1998 | Blase |
| D400,497 S | 11/1998 | Sabag et al. |
| D400,849 S | 11/1998 | Ikeda et al. |
| D402,955 S | 12/1998 | Smith et al. |
| D403,298 S | 12/1998 | Hall et al. |
| D403,299 S | 12/1998 | Smith et al. |
| 5,869,204 A | 2/1999 | Kottke et al. |
| 5,881,156 A | 3/1999 | Treni |
| D408,351 S | 4/1999 | Shim |
| 5,895,728 A | 4/1999 | Walker et al. |
| D409,559 S | 5/1999 | Shim |
| D409,560 S | 5/1999 | Shim |
| D409,975 S | 5/1999 | Zeller |
| 6,003,015 A | 12/1999 | Kang |
| 6,004,689 A | 12/1999 | Walker et al. |
| D419,131 S | 1/2000 | Andrews et al. |
| 6,041,243 A | 3/2000 | Davidson |
| 6,054,920 A | 4/2000 | Smith et al. |
| D432,982 S | 10/2000 | Miyashita |
| 6,130,953 A | 10/2000 | Wilton et al. |
| 6,148,175 A | 11/2000 | Freedland |
| 6,157,908 A | 12/2000 | O'Gwynn |
| 6,175,308 B1 | 1/2001 | Tallman et al. |
| 6,223,032 B1 | 4/2001 | Cuffaro |
| 6,230,214 B1 | 5/2001 | Liukkonen et al. |
| 6,236,732 B1 | 5/2001 | Griffin |
| 6,236,969 B1 | 5/2001 | Ruppert et al. |
| 6,252,510 B1 | 6/2001 | Dungan |
| D448,340 S | 9/2001 | Hall et al. |
| 6,300,871 B1 | 10/2001 | Irwin et al. |
| 6,311,071 B1 * | 10/2001 | Voroba et al. ........... 455/550.1 |
| 6,323,785 B1 | 11/2001 | Nickell et al. |
| 6,406,811 B1 | 6/2002 | Hall et al. |
| 6,426,697 B1 | 7/2002 | Capowski et al. |
| 6,430,299 B1 | 8/2002 | Hall |
| 6,512,832 B1 | 1/2003 | Braun et al. |
| 6,522,765 B1 | 2/2003 | Towle |
| 6,525,854 B1 | 2/2003 | Takahashi et al. |
| 6,754,361 B1 | 6/2004 | Hall et al. |
| 2002/0076060 A1 | 6/2002 | Hall |
| 2002/0132585 A1 | 9/2002 | Palmero et al. |
| 2002/0137466 A1 | 9/2002 | Bamburak et al. |
| 2003/0013503 A1 * | 1/2003 | Menard et al. ............. 455/569 |
| 2003/0072358 A1 | 4/2003 | Gurney et al. |
| 2003/0092453 A1 * | 5/2003 | Mills et al. ................. 455/463 |
| 2003/0134666 A1 | 6/2003 | Fletcher |

FOREIGN PATENT DOCUMENTS

| | | |
|---|---|---|
| DE | 198 02 659 | 7/1999 |
| DE | 100 24 041 | 12/2000 |
| DE | 201 14 127 | 11/2001 |
| EP | 0 019 838 A1 | 5/1980 |
| EP | 0 389 174 | 9/1990 |
| EP | 0676819 A2 | 10/1995 |
| EP | 0685894 A1 | 12/1995 |
| JP | 409283103 A | 10/1997 |
| JP | 11252017 | 9/1999 |
| WO | WO 89/06075 | 6/1989 |
| WO | WO 90/11657 | 10/1990 |
| WO | 90 09726 | 12/1990 |
| WO | WO 98/47311 | 10/1998 |

| WO | WO 99/60764 | 11/1999 |
| WO | 00 07176 | 10/2000 |
| WO | WO 01/78443 | 10/2001 |
| WO | WO 02/23932 | 3/2002 |
| WO | WO 03/061147 | 7/2003 |

OTHER PUBLICATIONS

"3M Headset Intercom System Model C960" operating instructions, 3M Food Services Trade Department, publ 78-6912-0671-4 Rev. F, May 1999.

"COM900BP Belt-Pac Communicator: Operating Instructions", HM Electronics, Inc. HME #400434-rev Aug. 30, 2000, pp. 1 and 1-8.

"COM400CC Communicator: Operating Instructions", HM Electronics, Inc. HME #400436-Rev Sep. 13, 2000. pp. 1 and 1-9.

* cited by examiner

WIRELESS INTERCOM SYSTEM

FIELD OF THE INVENTION

The present invention is directed to communication devices, and more particularly to a wireless intercom system.

BACKGROUND OF THE INVENTION

Intercom communication systems are frequently used in a wide variety of applications and across a broad range of industries. For example, in the fast food industry, patrons in a drive-through lane typically utilize a speaker and microphone next to the drive-through lane to communicate with one or more employees inside the restaurant. The patrons' orders are communicated to one or more employees inside the restaurant who often receive the orders via an intercom system that may include a desktop intercom or a wall-mounted intercom. Similarly, in the banking industry, tellers at banks having drive-through lanes may use an intercom system to communicate with customers. In the retail industry, stockroom and other employees commonly use intercom systems to communicate with one another within a large area, such as a department store or a warehouse. Also in the retail industry, an employee inside a gas station commonly uses an intercom system to communicate with a patron, such as a gas station employee communicating with a patron at a gas pump.

While being commonplace in many commercial settings, conventional intercom systems usually either include communications wiring or are designed to be worn or otherwise carried by the user. Where a conventional intercom system contains wiring, it is not easily moved from one location to another, yet changes in work flow or business requirements often dictate the need for flexibility and rapid changes. Improved intercom systems are also needed to accommodate individuals with specific physical handicaps.

SUMMARY OF THE INVENTION

A wireless intercom unit includes an electronics housing including a first side, where the first side is configured to interface with a planar surface. The intercom unit also includes a microphone configured to receive an audio signal input, the microphone located on a portion of the housing other than the first side, and a first channel transceiver for a first channel radio frequency range. The intercom further includes a speaker configured to broadcast the audio signal output and an input device, where both are located on a portion of the housing other than the first side.

A wireless communication system includes a wireless intercom unit and an earpiece for use with the wireless intercom unit. The intercom unit of this embodiment includes an electronics housing, a microphone for receiving an audio signal input, a first channel transceiver for a first channel radio frequency range, an earpiece transceiver for an earpiece radio frequency range, and a speaker for broadcasting the audio signal output. The earpiece includes a speaker, a microphone, a transceiver for the earpiece radio frequency range, and a wearable structure to secure the earpiece near a user's ear.

A wireless communication system of another embodiment of the invention includes a wireless intercom unit and a remote switch. The wireless intercom unit includes a first transceiver for a first radio frequency range, a receiver for a remote switch radio frequency range, a microphone for receiving an audio input, and a speaker for broadcasting an audio output. The switch includes a housing, a pressure sensor located inside or on the surface of the housing, and a radio frequency transmitter for the remote switch radio frequency range.

BRIEF DESCRIPTION OF THE DRAWINGS

The invention may be more completely understood by considering the detailed description of various embodiments of the invention that follows in connection with the accompanying drawings.

Figure 1:
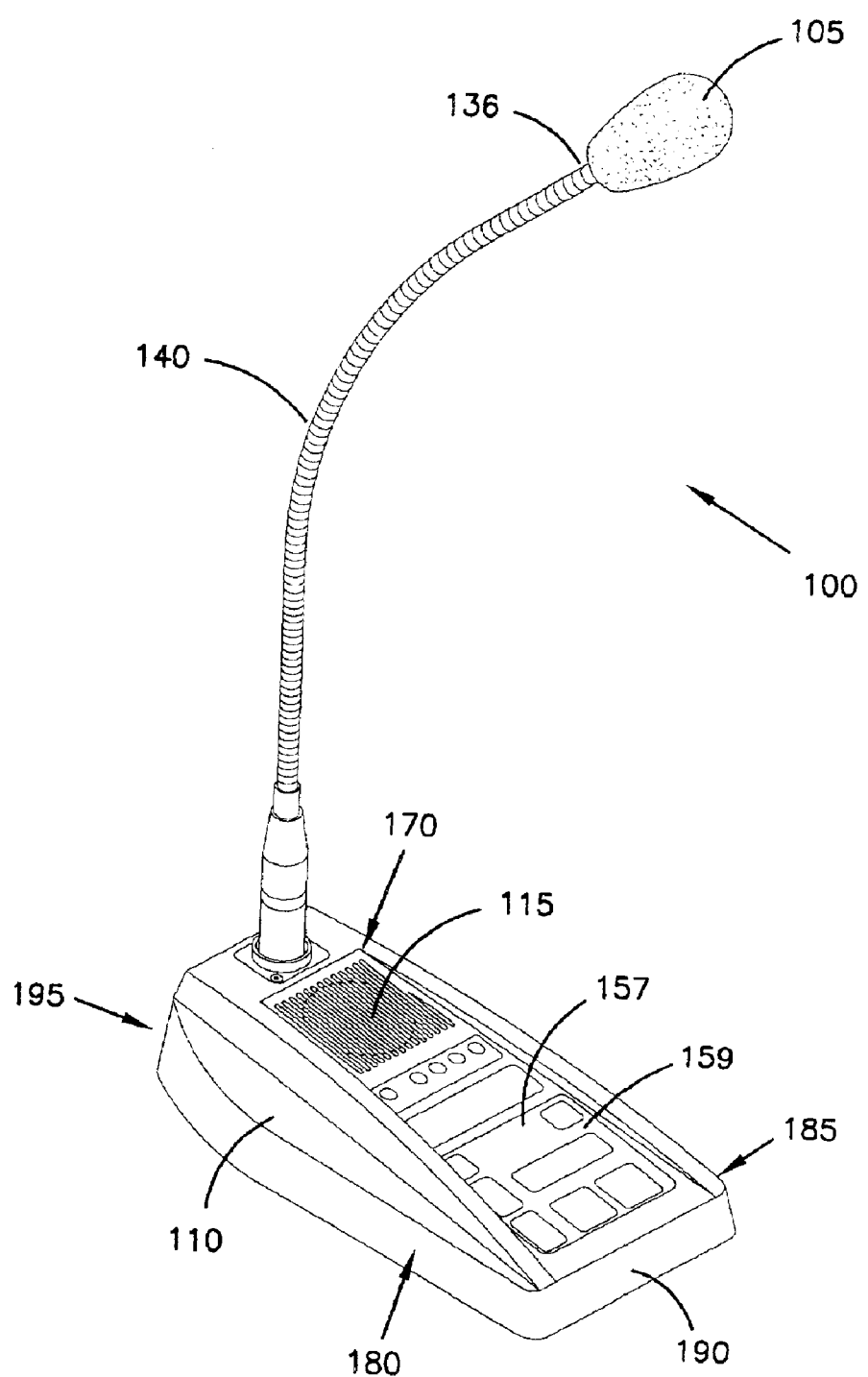
FIG. 1 is a perspective view from the front and side of an intercom of one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents and alternatives falling within the spirit and scope of the invention as defined by the appended claims.

DETAILED DESCRIPTION OF THE VARIOUS EMBODIMENTS

The present invention is believed to be applicable to a variety of systems and arrangements for communication in a commercial or retail setting. The invention has been found to be particularly advantageous in a setting where the user must be performing tasks in addition to using an intercom system. The invention has also been found to be advantageous where a user of an intercom device will generally be in one area while using the intercom but may want occasionally to reposition the intercom. While the present invention is not so limited, an appreciation of various aspects of the invention is best gained through a discussion of various application examples operating in such an environment. Throughout the description, identical reference numbers will be used to indicate identical elements.

Figure 2:
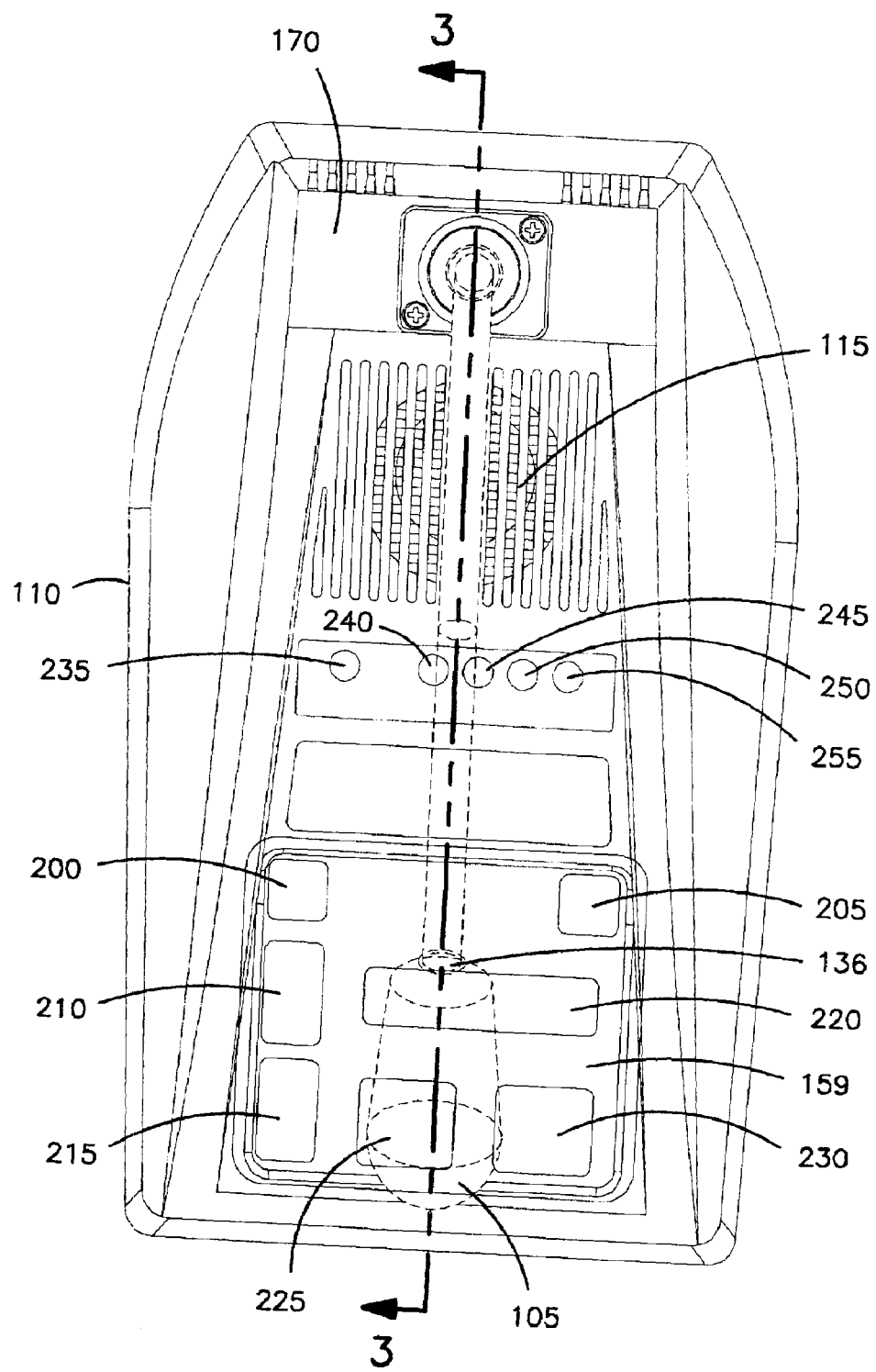
FIG. 2 is a top view of the intercom of FIG. 1.
Figure 3:
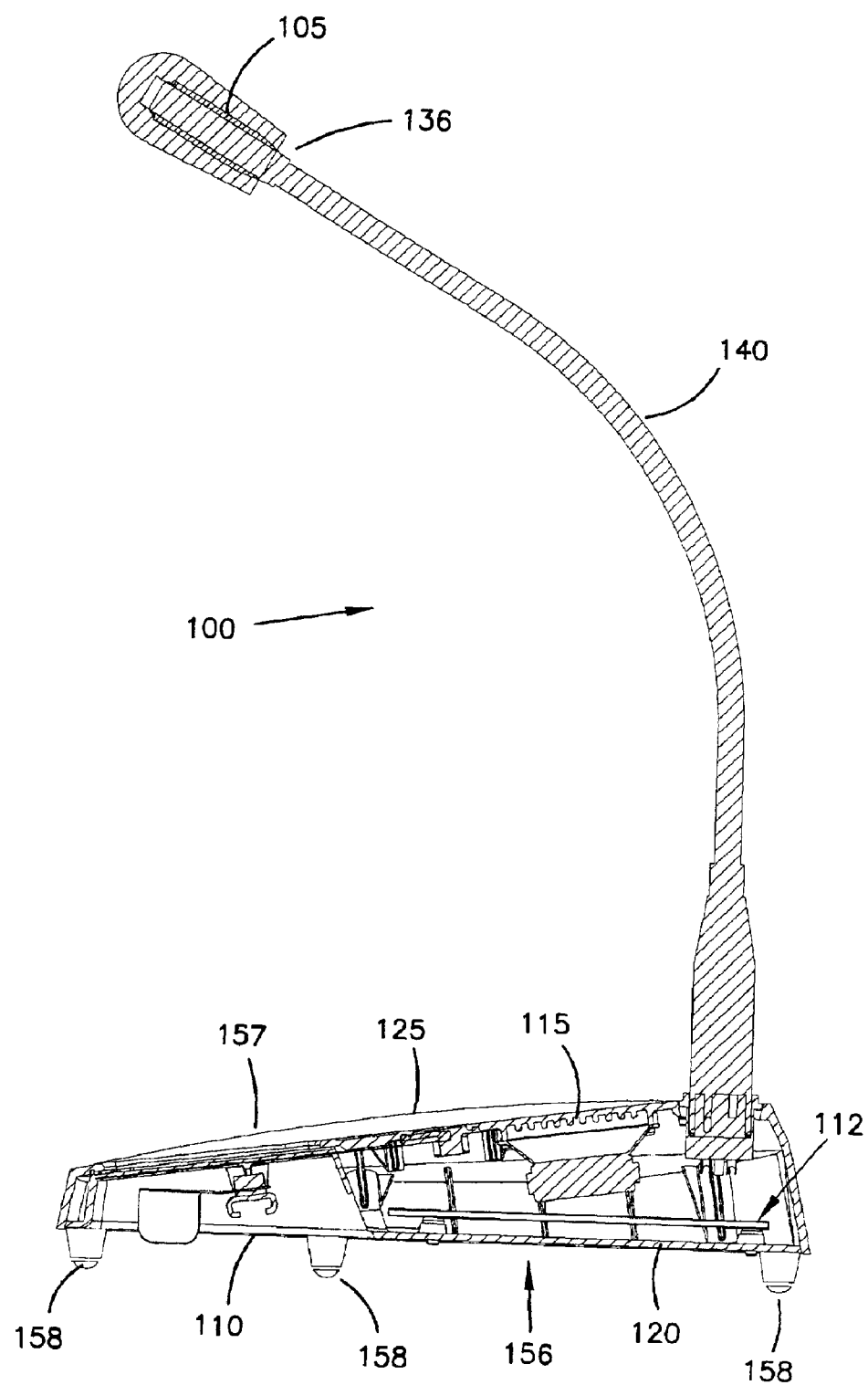
FIG. 3 is a cross-sectional view of a portion of the intercom of FIG. 2 taken along line 3—3 in FIG. 2.
Figure 4:
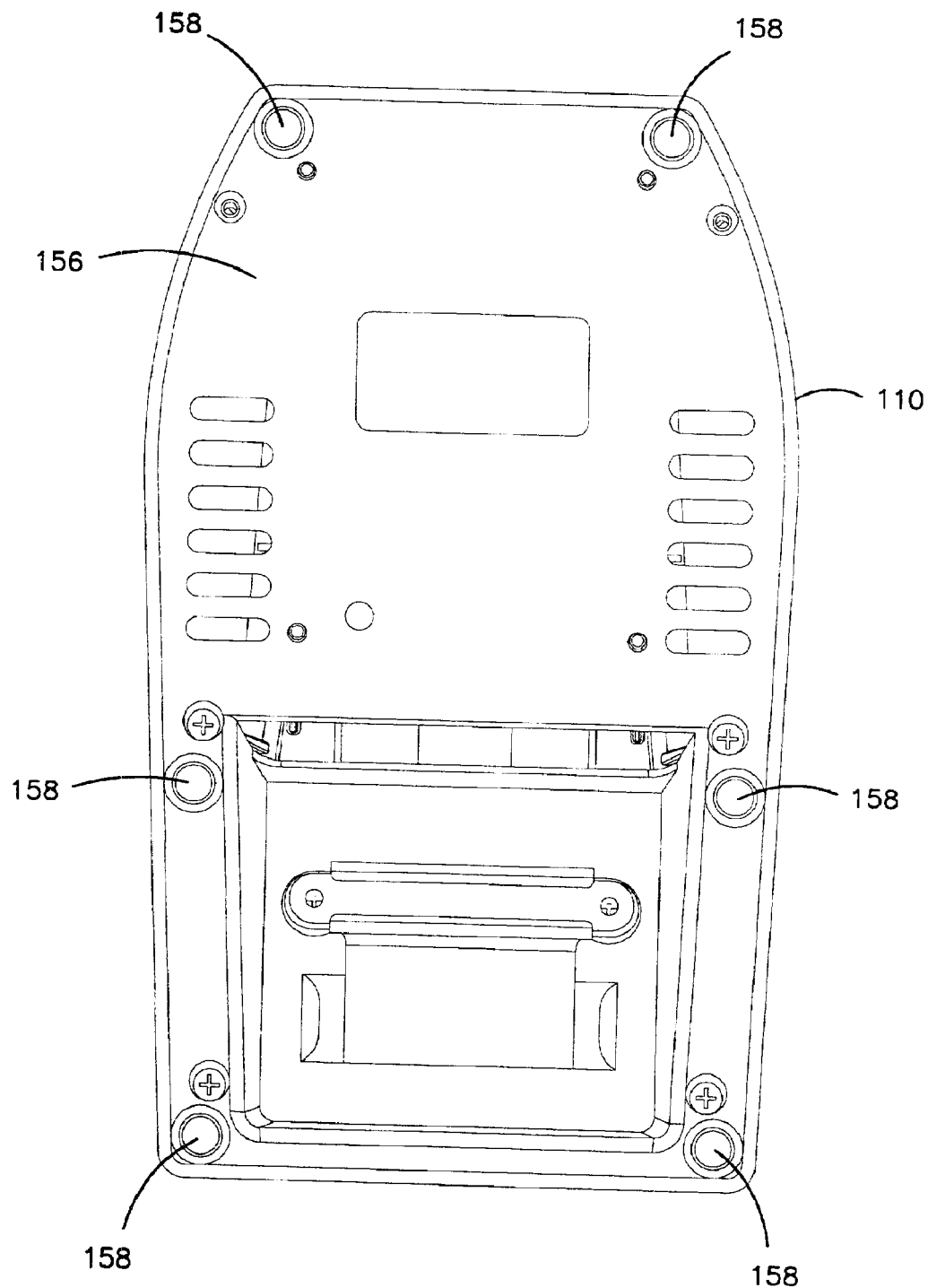
FIG. 4 is a bottom view of the intercom of FIG. 1 without a battery pack installed.
Figure 7:
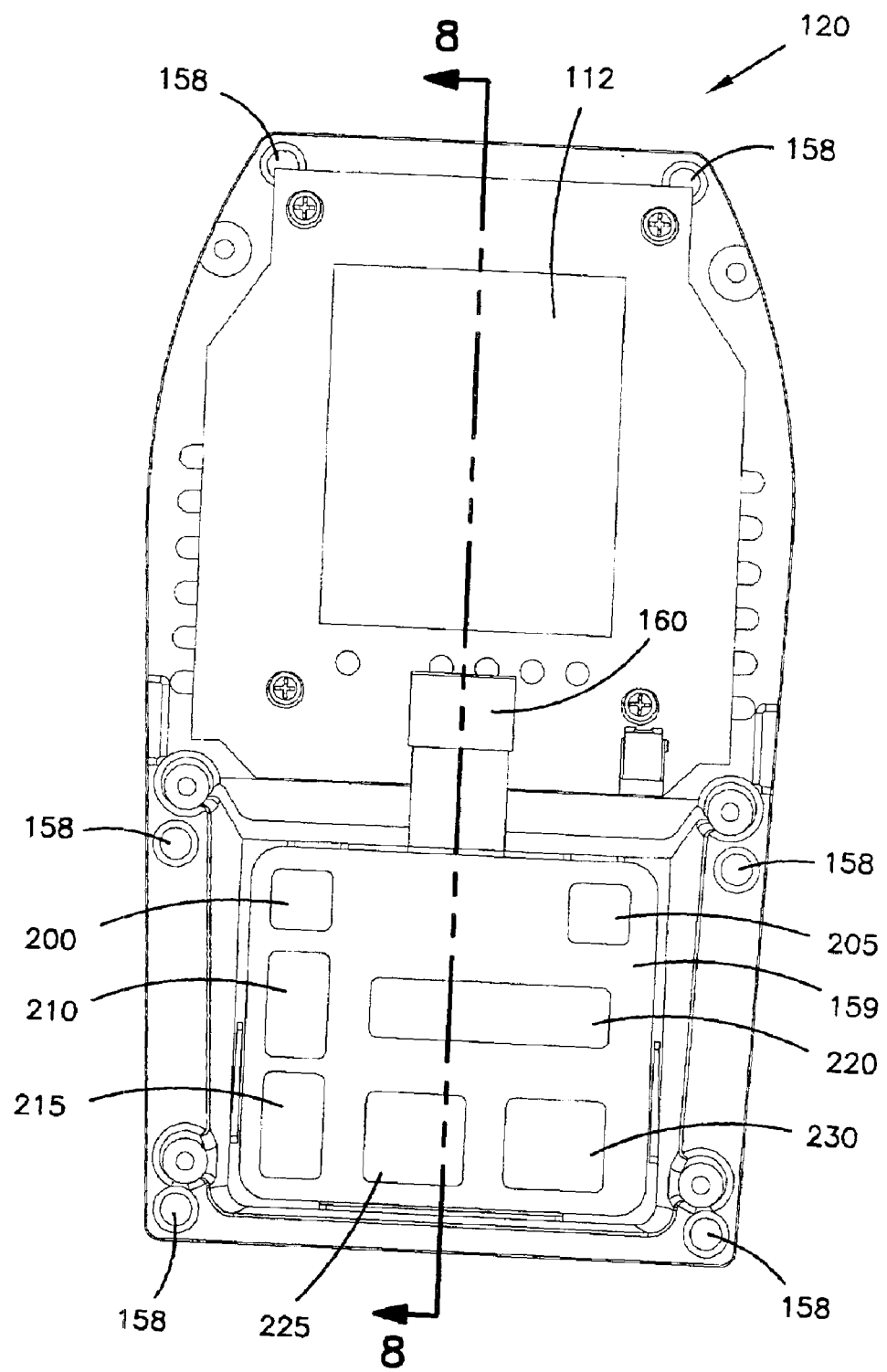
FIG. 7 is a top view of the base assembly of FIG. 6.
Figure 8:
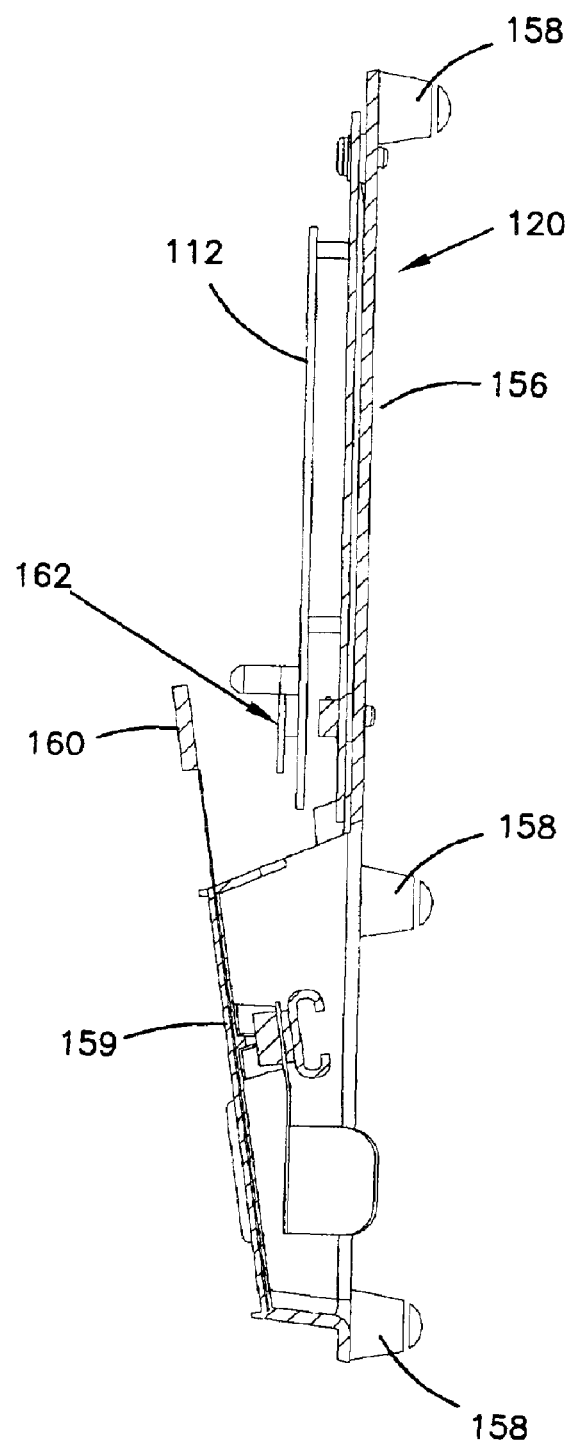
FIG. 8 is a cross-sectional view of the base assembly of FIGS. 6 and 7 taken along line 8—8 in FIG. 7.

FIGS. 1–10 illustrate one particular embodiment of an intercom of the invention. Now referring to FIG. 1, an intercom 100 includes a microphone 105, an electronics housing 110 and a speaker 115. The electronics housing 110 may include a base assembly 120 and a cover 125 as illustrated in FIG. 3. The base assembly 120 and the cover 125 join together to form the electronics housing 110. The base assembly is further illustrated in FIGS. 6–8. Now referring to FIG. 8, the base assembly 120 includes a first side or a bottom side 156 of the electronics housing 110. The bottom side 156 may be configured to interface with a planar surface upon which the intercom 100 may rest, shown in the side view of the base assembly in FIG. 8. The planar surface may be a horizontal surface or a vertical surface upon which the intercom 100 is mounted. The bottom side 156 may be substantially flat. The bottom side may include post structures or legs 158. In the illustrated embodiment as shown in FIG. 7, six legs or posts 158 are attached to the bottom side 156. However, no posts, three posts, four posts, five posts, eight posts or any other number of posts or other supporting structures may be provided on the bottom side 156. Now referring to FIG. 6, the base assembly 120 may include a panel 159 for various input devices 200, 205, 210, 215, 220, 225 and 230, which will be described in further detail herein. The base assembly 120 also includes a connector 160 for interfacing with an electronics board 112 by connecting with a connector 162 on the electronics board 112.

Figure 9:
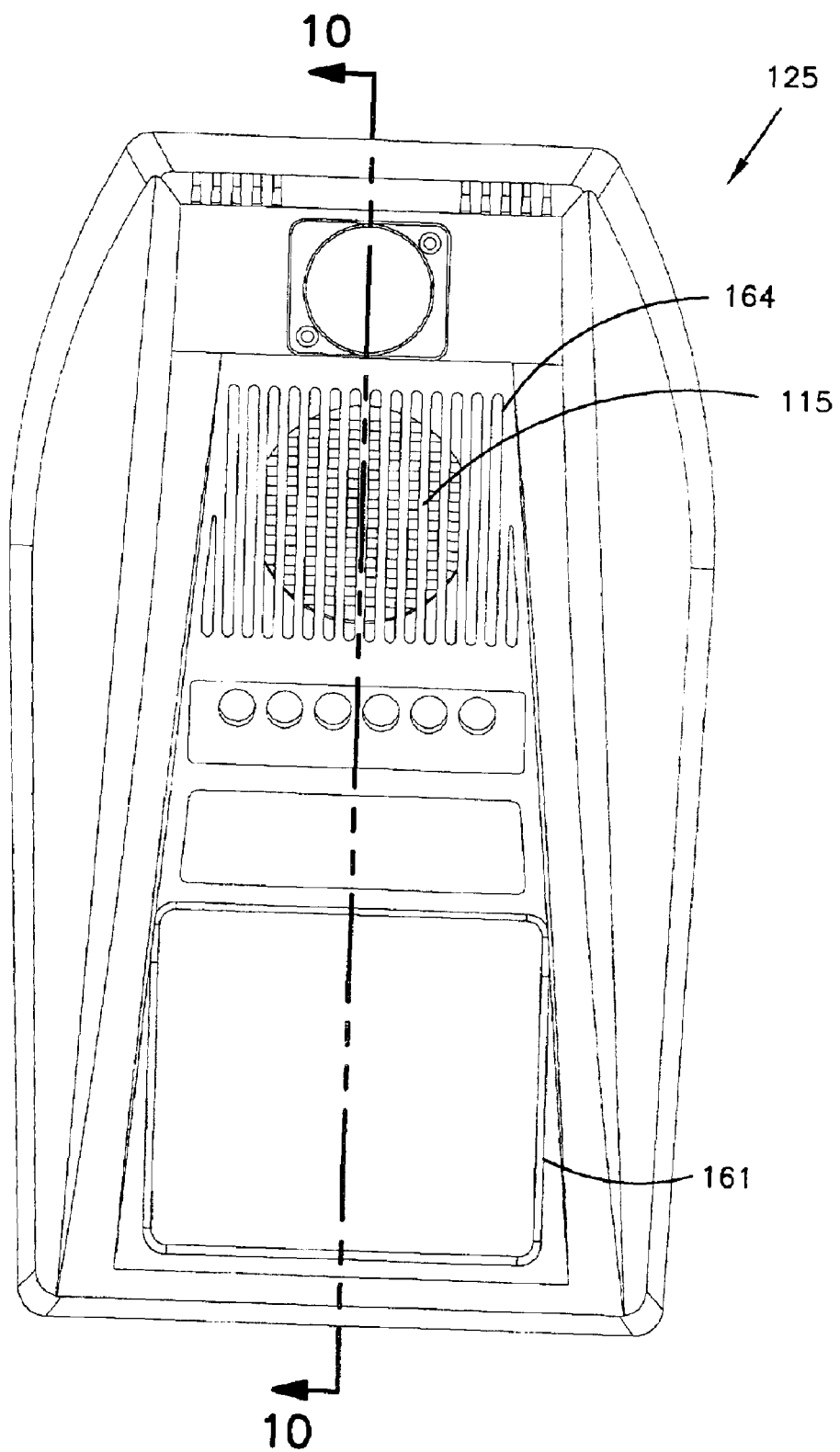
FIG. 9 is a top view of the cover of one embodiment of the intercom of FIG. 1.
Figure 10:
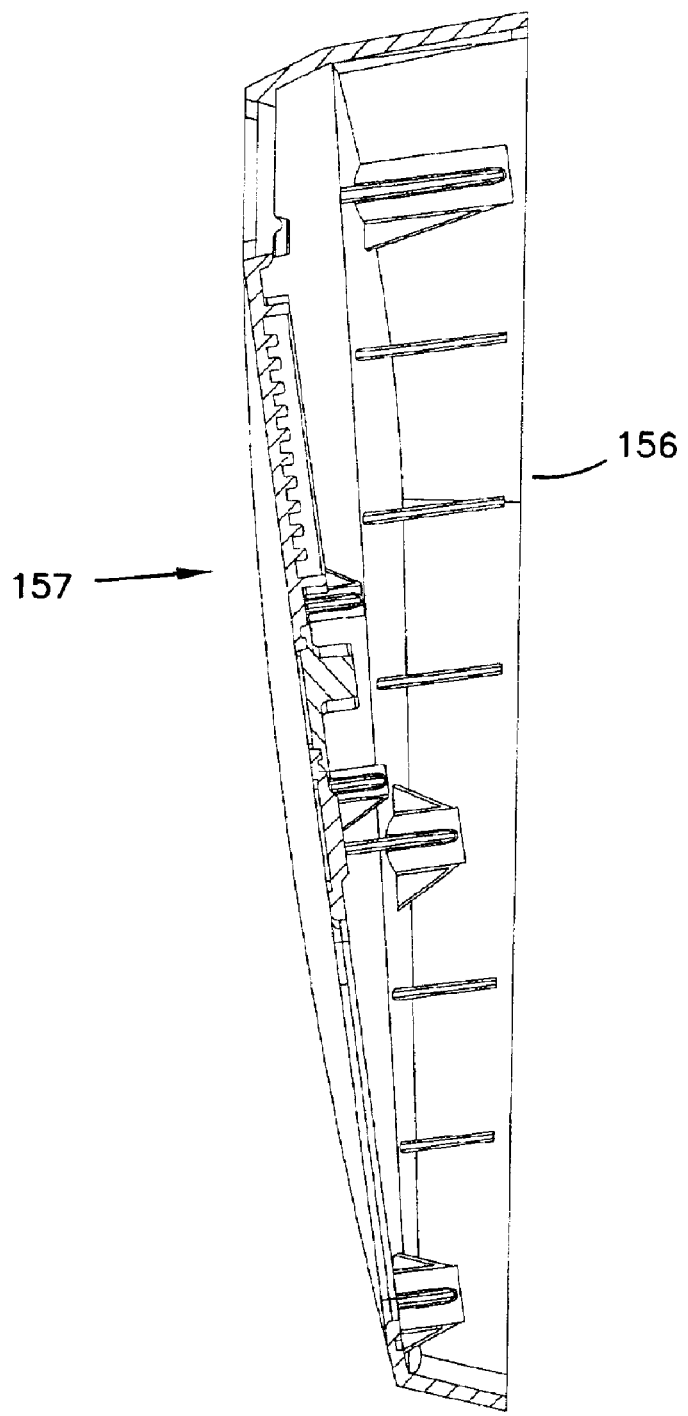
FIG. 10 is a cross-sectional view of the cover of FIG. 9 taken along line 10—10 in FIG. 9.

Now referring to FIG. 9, the cover 125 includes an opening 161 for allowing the panel 159 to show through. The cover 125 also includes a partial opening 164 for the speaker 115. The cover 125 may attach to the base assembly using one of many different types of fasteners. The cover may include a second side 157 of the electronics housing, where the second side or top side faces a user during typical use of the intercom.

Figure 22:
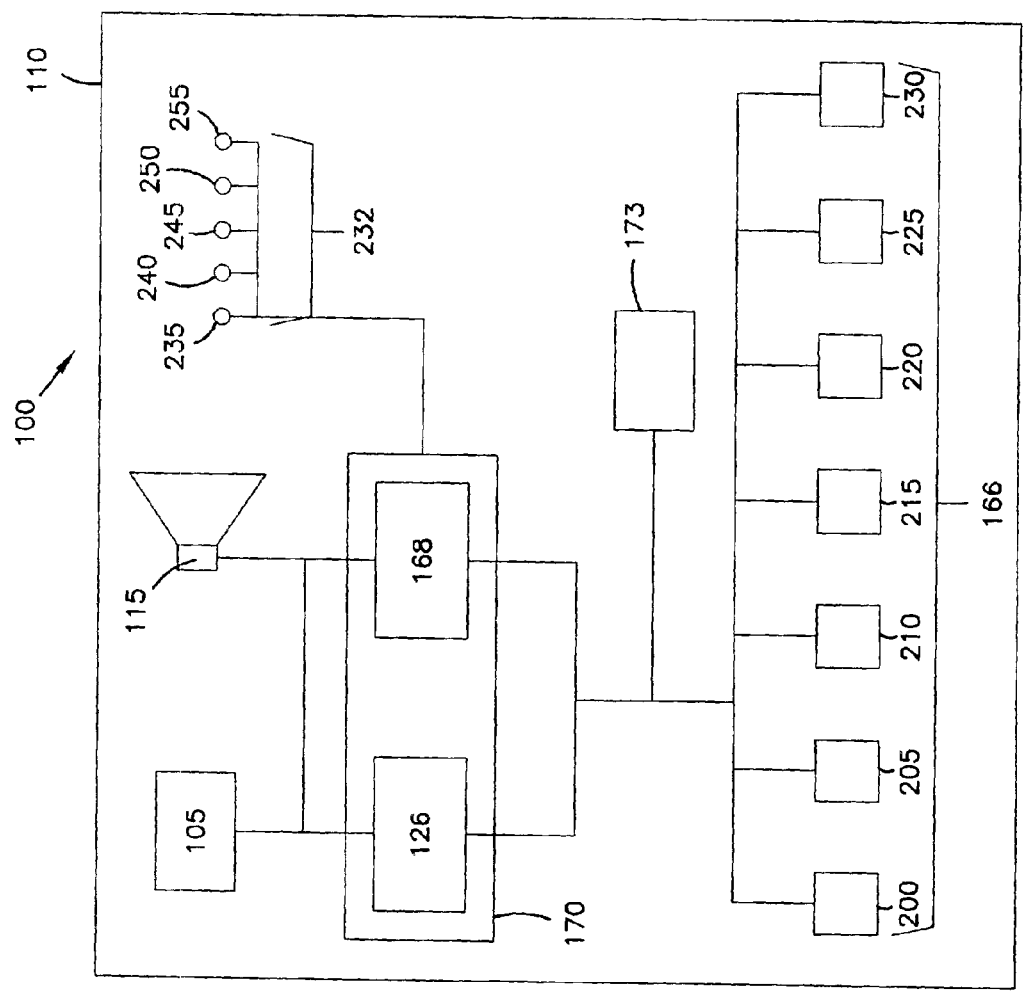
FIG. 22 is a diagram depicting one possible embodiment of an intercom of the present invention.

FIG. 22 is a block diagram showing the components of the intercom 100 according to one embodiment. The electronics housing 110 includes a first transceiver 126 operably connected to the speaker 115 and a microphone 105. The intercom 100 also includes several input devices 166 that are described in more detail below. The intercom 100 may optionally include a second transceiver 168 to allow the intercom 100 to communicate on two different channels, as discussed below. However, it also possible for the intercom 100 to include only the first transceiver 126 and only communicate on one channel or frequency. Intercom 100 also includes a power source 173 which may be either a battery or a connection to a standard outlet.

The transceivers 126 and 168 are within the electronics housing 110 and may be within an additional housing. They may be part of an electronics board 112, shown in FIG. 8. The first transceiver can send and receive radio frequency signals within a first radio frequency range. Again referring to FIG. 22, the transceivers 126 and 168 may also be able to perform a processor function where the transceiver can receive a radio frequency signal within one range and convert that signal to a different radio frequency signal that falls within a radio frequency range other than the first radio frequency range. This transmission function will be discussed in more detail with respect to one embodiment of the invention. An antenna may be provided that is operably connected to the transceiver or transceivers. The antenna may be outside of or within the intercom 100. Preferably, the antenna are provided on the electronics board 112.

Prior to this invention, many intercom systems were not easily relocated because they required communication wiring. In addition, some systems require wiring to provide power. Other wireless intercom systems are known, but are typically configured to be worn by a user as a headset. Some wireless systems are difficult to relocate because they include a non-integral antenna. Now referring to FIG. 16, the intercom 100 may be part of an intercom system 172 that includes wireless headset units. The intercom 100 may communicate via signals within a first radio frequency range with a base station 145. The base station 145 may then relay that communication to other devices either via radio signals or via wiring. One embodiment of the wireless intercom system 172 of the present invention consists of one intercom 100, one base station 145, and one additional communication device. The additional communication devices may be any of one or more intercoms 100, one or more headsets 150, one or more speaker post intercoms 440, or another communication device. The base station may be similar to the base station described in U.S. patent application Ser. No. 09/740,524, filed Dec. 19, 2000, titled "Programmable Headset and Programming Method and Apparatus," which is hereby incorporated herein in its entirety.

Figure 5:
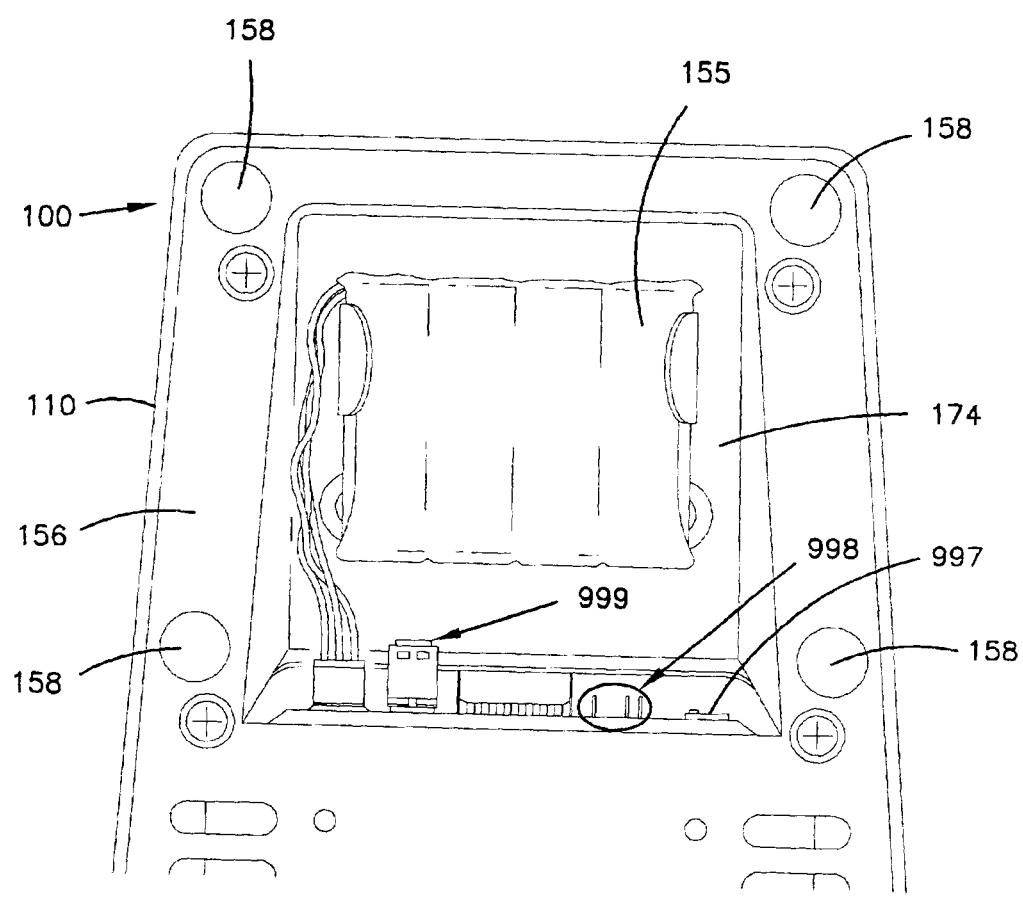
FIG. 5 is a partial bottom view of the intercom of FIG. 1 with a battery pack installed.
Figure 6:
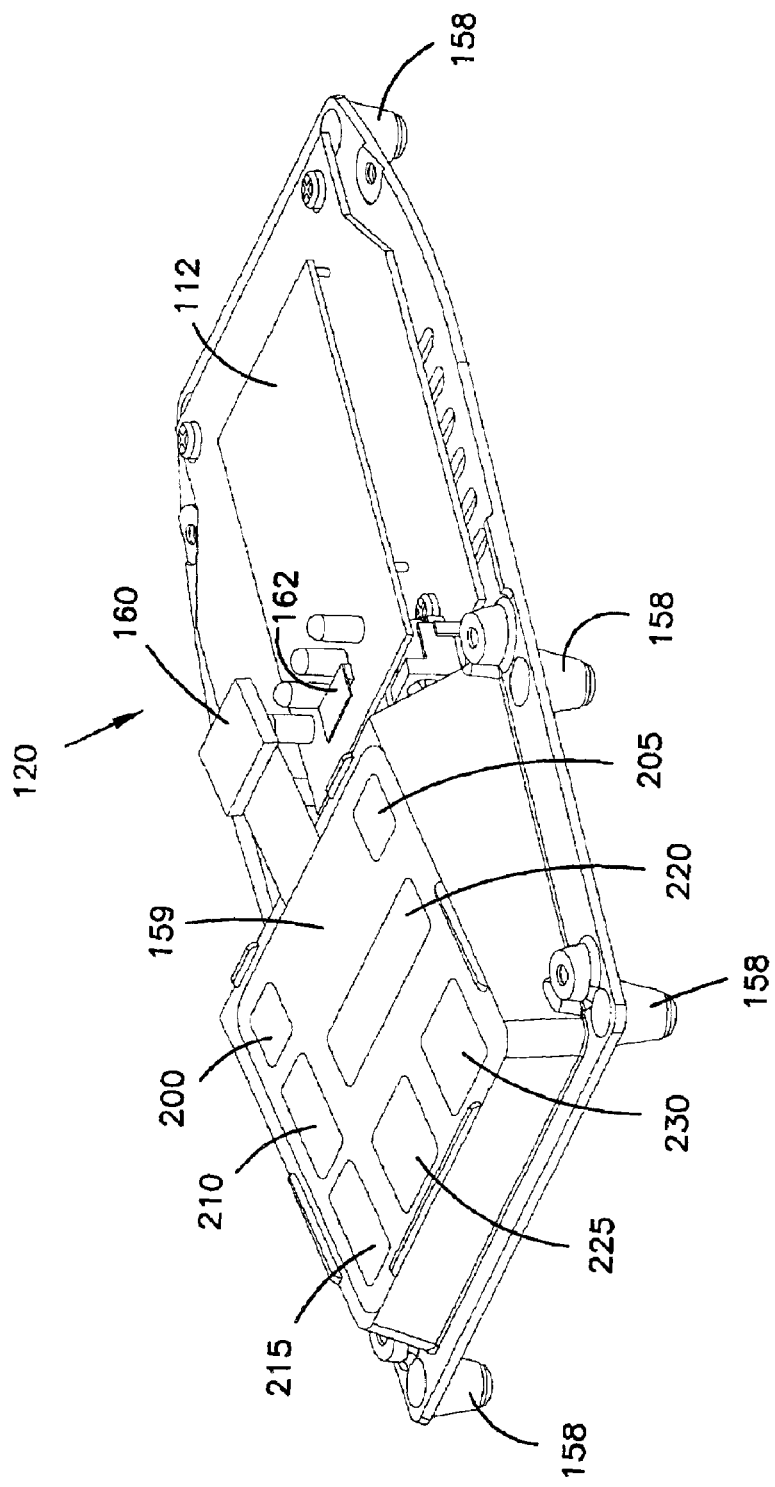
FIG. 6 is a perspective view from the front and side of a base assembly of one embodiment of the intercom of FIG. 1.

The intercom 100 may be powered by a battery pack 155 illustrated in FIG. 5. The battery pack 155 is located in a battery cavity 174 in the electronics housing 110. The battery cavity may be covered by a removable cover. The battery pack may also be located in other positions such as on the electronics board 112, shown in FIG. 8, or outside of but connected to the electronics housing 110. In another embodiment, the intercom 100 may receive power through a power cord connected at one end to the intercom 100 and connected at the other end to an external power supply that receives power from an outlet, such as a standard 120 volt outlet. In another embodiment, the intercom 100 may be equipped with both a battery pack 155 and a power cord.

Figure 17:
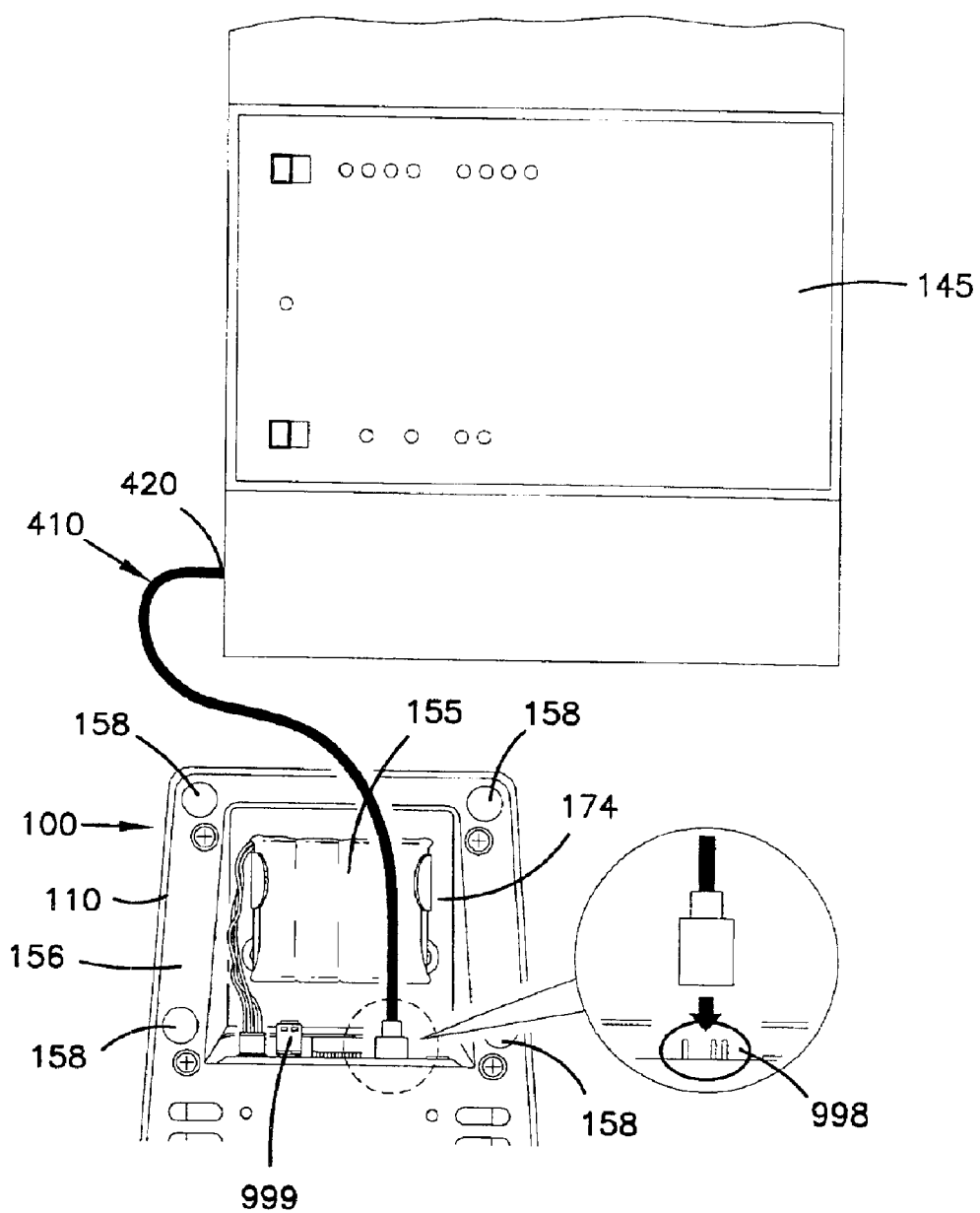
FIG. 17 is a diagram depicting one possible configuration of an intercom system when arranged for programming of the intercom of FIG. 1.
Figure 18:
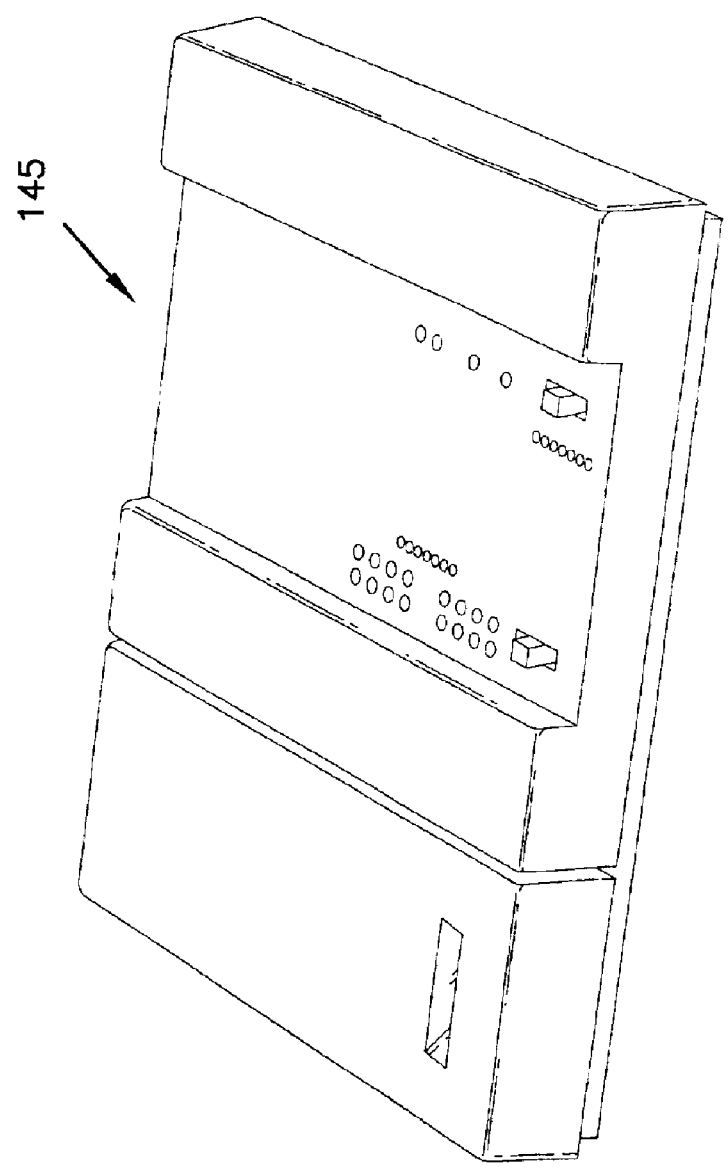
FIG. 18 is a top view of one embodiment of a base station that may communicate with the intercom system of the present invention.

The intercom 100 and the base station 145 operate on the same channel, or in other words, within the same radio frequency range. In one embodiment, the intercom 100 can be programmed to operate on any one or more of different channels with each channel operating within a frequency range. In one programming method, the intercom is connected to the base station and the base station sends signals to the transceiver or transceivers of the intercom to indicate the radio frequency at which each transceiver will communicate. FIGS. 5 and 17 illustrate one embodiment in which the intercom 100 can be programmed to operate on any one of different channels. The base station 145 and the intercom 100 both must be turned on. The intercom 100 may then be programmed by plugging one end of the programming cable 410 into the programming jack 420 of the base station 145 and plugging the other end of the programming cable 410 onto the three gold pins 998 located on the intercom. In another embodiment, non-contact or fixed switches are used instead of the three gold pins to accomplish the programming. The intercom 100 may also be programmed using infrared signals. A method for programming a communication device using infrared signals is described in U.S. patent application Ser. No. 09/740,524, filed Dec. 19, 2000, which was previously incorporated by reference in its entirety. The intercom speaker 115 will emit audible tones when the programming is complete.

The intercom 100 may have one or more input structures such as push buttons, toggle switches or dials on the outside of its electronics housing. Each input structure may be configured to activate a different function. FIGS. 2 and 22 illustrate a push button 200 to activate the function of turning the intercom on by adding power, a push button 205 to activate the function of turning the intercom off by removing power, a push button 210 to activate the function of increasing the speaker volume, a push button 215 to activate the function of decreasing the speaker volume, a push button 220 to activate a PAGE function described below, a push button 225 to activate a TALK1 function described below for using a first channel, and a push button 230 to activate a TALK2 function described below for using a second channel.

The intercom 100 may have a PAGE function. This function allows users of select communication devices to talk to one another without being heard by users of other select communication devices. The system 172 can be configured so that when a user of an intercom 100 pushes a page button 220, only users of selected other communication devices hear what the user of the intercom 100 says. This can be used in several environments. For example, employees of a fast food restaurant could use this feature to talk to one another without allowing a patron in the drive-through lane to hear the communication. Similarly, bank employees could talk to one another without allowing a bank customer in a drive-through window to hear the communication. Similarly, employees at a convenience store could talk to one another without allowing a convenience store customer at a gas pump to hear the communication.

The intercom 100 may have a PAGE MONITOR function that can be activated by pressing a certain sequence of input buttons. For example, in one embodiment the PAGE MONITOR function can be activated by turning the intercom off by pushing the power off button 205 and by then pressing and holding the page button 220 while turning the intercom on by pressing the power on button 205. Once the intercom is in the PAGE MONITOR function, a user of the intercom can hear a PAGE signal from another operator without hearing communication between other operators and customers. When the user hears a PAGE signal, the user can respond to the PAGE signal by pressing the page button 220. A user can disengage the PAGE MONITOR function by pressing the power off button 205 and then pressing the power on button 205.

The intercom 100 may have a TALK function that can be activated by pressing channel buttons, such as a TALK1 button 225 or a TALK2 button 230. When the function is activated, the electronics process the signal received via the microphone and transmit a signal via radio waves. The system can be configured so that the user of the intercom 100 can talk to only certain other users. For example, the system can be configured so that when the TALK1 button 225 is pressed, the voice of the user of the intercom 100 is transmitted to a patron in one drive-through lane and when the TALK2 button 230 is pressed, the voice of the user of the intercom 100 is transmitted to a patron in a second drive-through lane. This is accomplished by having a first and a second transceiver 126, 168 and by having the system programmed so the TALK1 feature and the TALK2 feature operate on two different channels. In other words, when operating with the TALK1 feature, the first transceiver 126 is transmitting and receiving within one radio frequency range. When operating with the TALK2 feature, the second transceiver 168 is transmitting and receiving within a different radio frequency range. The system can be configured to have any number of different subsets of specified users and is not limited to two sets of specified users as described in this example. Additional transceivers may be provided allowing for additional channel options and user subset options.

While it is not necessary, the intercom 100 may have one or more output structures 232 such as light emitting diodes (LEDs) on the outside of its electronics housing as illustrated in the block diagram FIG. 22. Each output structure would provide information on a different state of the system. FIG. 2 illustrates an LED 235 to indicate when the intercom system is powered on, an LED 240 to indicate when the TALK1 push button 235 is pressed, LED 245 to indicate when the TALK2 push button is pressed, LED 250 to indication when the PAGE push button 220 is pressed, and LED 255 to indication when the battery pack is low. Alternate output structures may be used instead of LEDs, such as a display screen, tactile structures, light bulbs or other indicators.

In one embodiment, the top side 157 and bottom side 156 of the electronics housing 110 are generally rectangular. In the embodiment of FIG. 1, the housing has a front 190, a back 195, a left side 180, and a right side 185, all of which are generally vertical. The back is taller than the front, giving the sides a generally trapezoidal shape, and giving the top a slope downward from the back of the top to the front of the top. The microphone 105 may be on the end 136 of an elongated neck 140 arising from the top 157 of the housing. The speaker may be on the top side 157, and various input structures 200, 205, 210, 215, 220, 225, 230 and output structures 235, 240, 245, 250, 255 may also be located on the top side 157 of the housing.

The bottom side 156 of the housing 110 of the intercom 100 is configured to rest on a planar surface, such as a horizontal planar surface, a planar mounting device, or a vertical planar surface if the intercom 100 is mounted on a wall. The bottom side 156 may be substantially flat. The bottom side 156 may include three or more leg or post structures 158. On a horizontal planar surface, such as a countertop, the intercom rests in a stable position so that the top side of the housing faces the user. The top side 157 may include components that a user will access easily when the housing is resting on the bottom side 156, such as any of the group including the microphone 105, power buttons 200, 205, volume buttons 210, 215, output devices 235, 240, 245, 250, 255 or a page button 220. In one embodiment, the microphone, speaker and one input device are located on a portion of the housing other than the bottom side. Examples of input devices include power buttons, channel buttons and page button. Preferably, the microphone and an input device are located on the top side 170. More preferably, the speaker is also located on the top side 170.

The intercom 100 can be various sizes and shapes. In one embodiment shown in FIG. 1, the cover is approximately 5½ inches wide at its narrowest point, 6½ inches wide at its widest point, 1¼ inches high at its shortest point, 2½ inches high at its highest point, and 9½ inches in length. In this embodiment, the combined length of the microphone neck 140 and the microphone 105 is approximately 16 inches.

Figure 16:
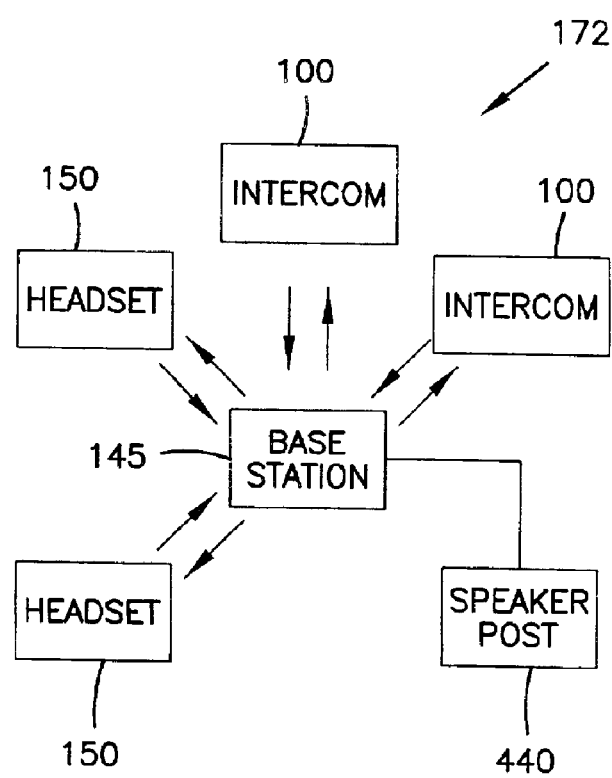
FIG. 16 is a block diagram of one embodiment of an intercom system of the present invention.

Now referring to FIG. 16, the use of intercom system 172 will be described. In this embodiment, the intercom 100 communicates with the base station within a first frequency range and possibly also within a second frequency range if a second transceiver is present. A user activates a TALK function of the intercom 100 and speaks into the microphone 105. The transceiver 126 converts the microphone input into a radio frequency signal and transmits the signal within the first radio frequency range. The base station 145 receives this signal within the first radio frequency range and transmits the signal to the additional communication device or devices. The base station 145 also receives from the additional communication device or devices signals within the first radio frequency range, which the base station transmits within the first radio frequency range to the intercom 100. The transceiver 126 converts the incoming signal into a voice signal and broadcasts this voice signal through the speaker 115. Similar steps may occur for a second frequency range where the user selects the second channel.

There are numerous situations in which one using an intercom might want to use a lightweight earpiece in conjunction with the intercom. For example, in a bank, customers in a drive-through window expect privacy and would not want personal information broadcast to anyone within earshot of the intercom. While one could use a wireless headset instead of an earpiece and an intercom, a headset including all the components of the intercom is heavier, larger, more cumbersome, and more likely to interfere with a user, including with a user's hair. An earpiece could also be useful for personnel with physical disabilities, such as hearing loss, who may require more focused communications.

Figure 19:
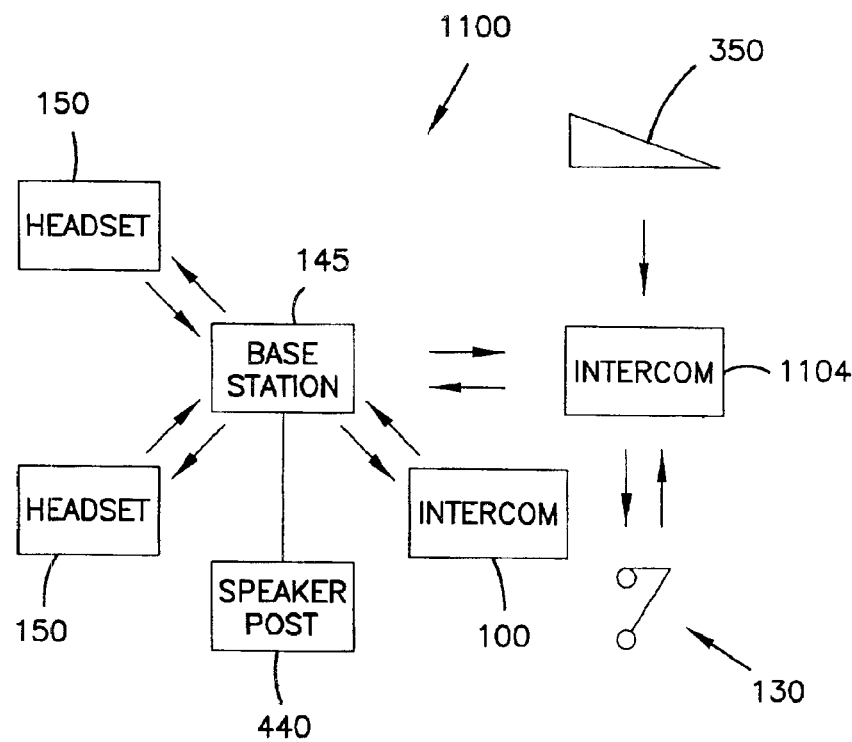
FIG. 19 is a diagram depicting one possible configuration of an intercom system including a base station, an intercom, an earpiece, a foot switch, and other communication devices.

FIG. 19 shows one embodiment of a wireless intercom system 1100 including a base station 145, at least one intercom 1104, at least one remote earpiece 130, and at least one other communication device, such as a headset 150, an intercom 100 and speaker post 440. The system 1100 of FIG. 19 may include components identical to the components of system 172 of FIG. 16, and identical reference numbers will be used to identify identical components. The intercom 1104 may include some or all of the same components of the intercom 100 discussed herein in some embodiments, but does not necessarily have the same features as intercom 100. Likewise, intercom 100 may include some or all of the features of intercom 1104 in some embodiments, but does not have to have the same features as intercom 1104. The intercom 1104 is configured to send and receive radio frequency transmission to and from the base station 145, where the base station may send and receive radio frequency transmission to and from the intercom and to and from other communication devices, such as a headset 150, an intercom 100, or a speaker post 440. Accordingly, the intercom 1104 may include a first transceiver 126 for communicating with the base station in a first radio frequency range. Intercom 1104 may also include a second transceiver 168 for communicating with the base station at a second frequency range.

Figure 23:
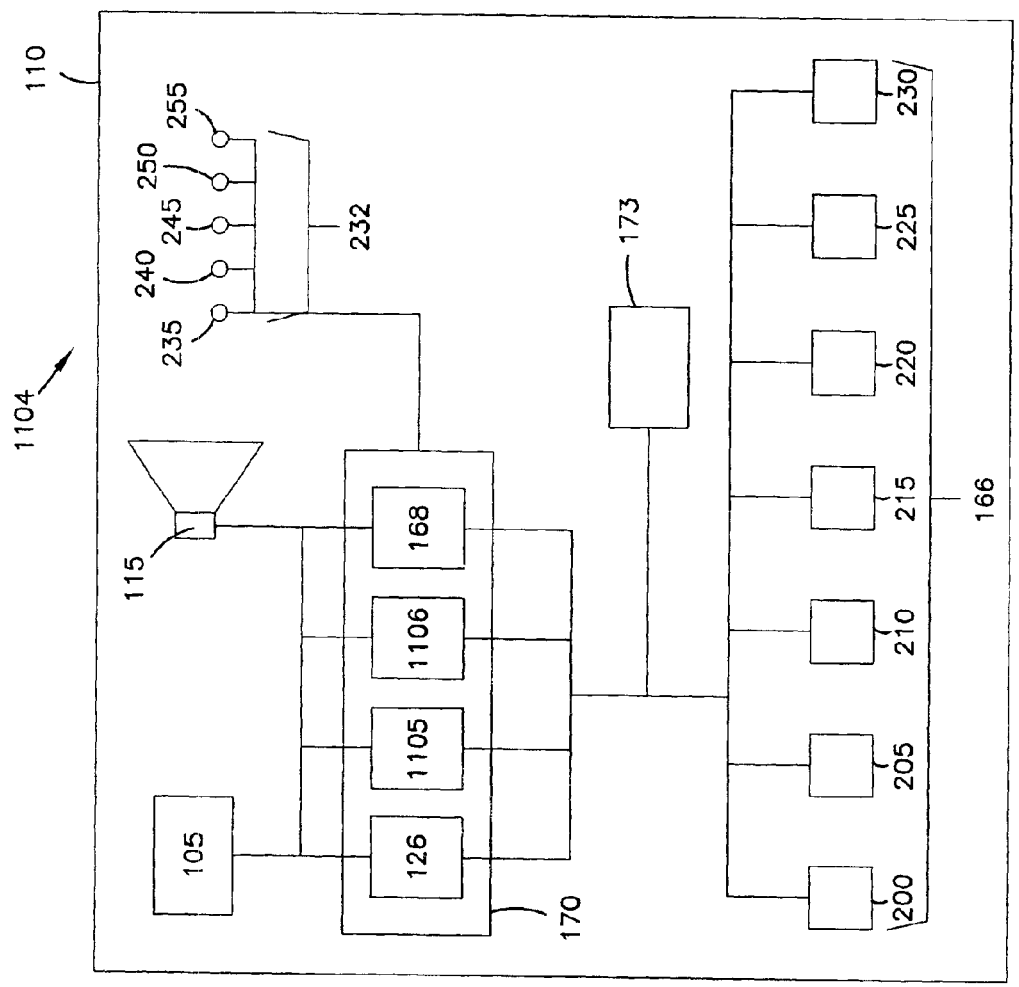
FIG. 23 is a diagram depicting another possible embodiment of an intercom of the present invention.

FIG. 23 shows a block diagram of intercom 1104 that can be used with an earpiece. The intercom 1104 is designed to communicate wirelessly with the earpiece 130 using an earpiece transceiver 1105 operating at an earpiece radio frequency range different from the first channel radio frequency range or any second channel radio frequency range. In use, the intercom 1104 receives a communication from the base station. The earpiece transceiver of the intercom 1104 transmits the communication at the earpiece radio frequency to the earpiece. Now referring to FIG. 11, the remote earpiece 130 may include an earpiece transceiver 133, a speaker 131, a microphone 132, and a power supply 136. When the user of the remote earpiece speaks, that communication is received by the microphone 132 and transmitted via the earpiece radio frequency to the intercom 1104 by the earpiece transceiver 133. The intercom receives this communication and transmits it to the base station using the first or second radio frequency.

The earpiece 130 and intercom 1104 are designed to communication over a shorter transmission distance than is typical between the base station and the intercom 1104. The base station and the intercom 1104 are designed to communicate with one another over a longer distance range than are the intercom 1104 and the earpiece 130. Preferably, a user wearing the remote earpiece 130 will be located near an intercom 1104, such as sitting at a desk where the intercom 1104 is located. Because of this, the signals within the first frequency range that are sent between the base station and the intercom may be transmitted at a higher power level than are the signals within the earpiece frequency range that are transmitted between the intercom and the earpiece.

Intercom 1104 may have a switch that can be used to disable the speaker 115 and microphone 105. The switch 997 is illustrated on the intercom 100 as located on a bottom side of the intercom 100, as shown in FIG. 5, and can be similarly located on intercom 1104. The switch 997 may also be located on other parts of the electronics housing 110, such as the top 157 or a side. Disabling the speaker 115 and microphone 105 can be beneficial when using the earpiece 130 because doing so provides additional privacy by limiting who can hear the transmission to the wearer of the earpiece 130. The switch 997 has no effect on the functionality of the input devices 166. When using the earpiece 130, the earpiece wearer may use any of the input devices 166. The earpiece transceiver 1105 and the foot switch receiver 1106 can be added to the electronics board 112, or they can be added elsewhere within the electronics housing 110.

Figure 11:
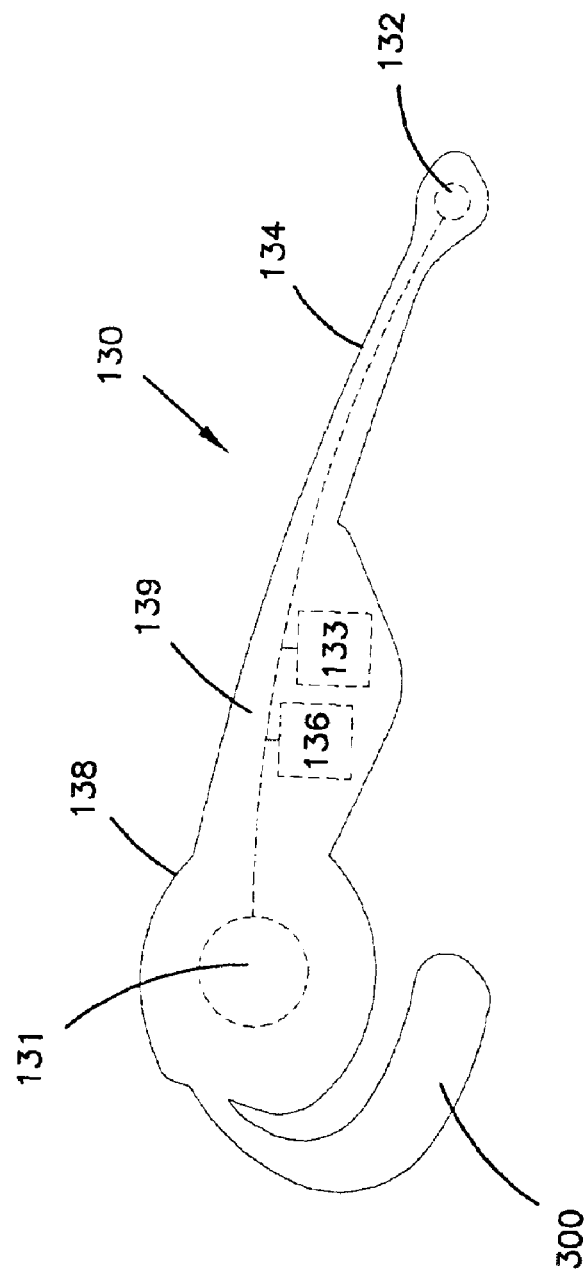
FIG. 11 is a perspective view of a remote earpiece of one embodiment of the present invention.
Figure 12:
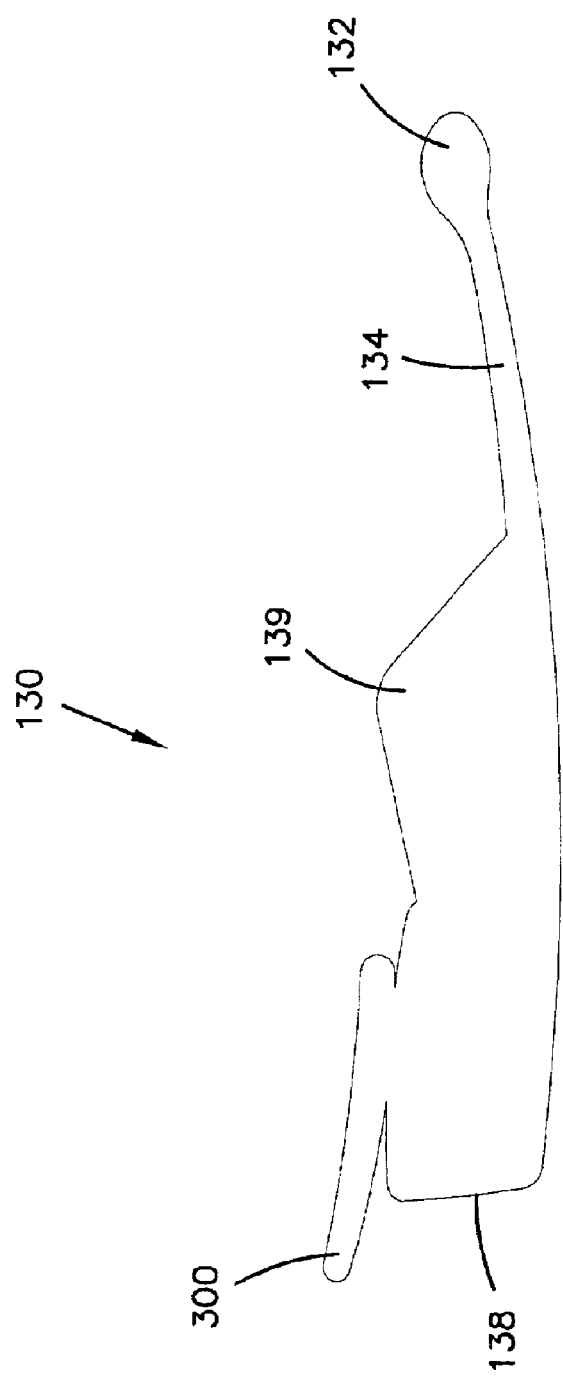
FIG. 12 is a side view of the remote earpiece of FIG. 11.

The outer housing 138 of removable earpiece 130 is illustrated in FIGS. 11 and 12. The remote earpiece 130 comprises a curved structure 300 designed to fit around the back side of the outer ear of a user, an electronics housing 139 connected to the curved structure 300 and designed to rest proximate the outer ear of the user, and a microphone 132 at the end of a microphone extension 134 extending from the electronics housing 139. The electronics housing 139 houses the earpiece speaker 131, the earpiece power supply 136 and the earpiece transceiver 133. These components are represented within the earpiece housing 139 in dashed lines in FIG. 11. Again referring to FIG. 12, the microphone extension 134 is configured so that when the curved structure 300 is fit around the back side of the outer ear of the user and the speaker 131 is proximate the outer ear of the user, the microphone 132 is in close proximity to the mouth of the user. The remote earpiece 130 also comprises an earpiece transceiver. System 1100 allows communication between the user of the remote earpiece 130 and the user of the other communication devices. A wireless earpiece for use in the wireless intercom system described herein can be purchased from Golden Eagle, Taiwan, SyberSay Communications, San Jose, Calif., or Electronik Huesit, Sweden.

There are numerous situations in which a user might wish to use a foot switch rather than the user's hands to provide input to the intercom 100 or intercom 1104. For example, a restaurant employee working in a drive-through lane might wish to use her foot to activate the microphone, rather than using her hand to push a TALK1 or TALK2 button. This allows the user to control whether her speech is transmitted while performing an unrelated task with her hands.

Figure 13:
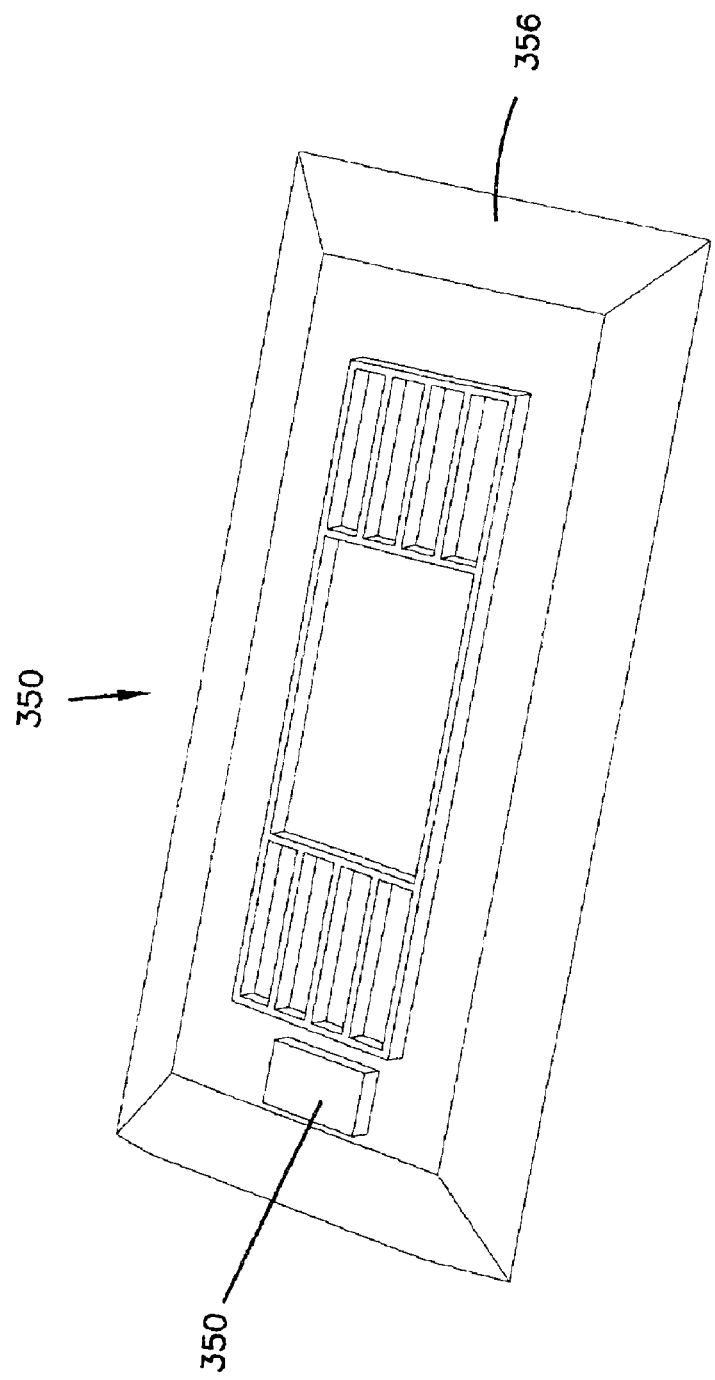
FIG. 13 is a perspective view of a remote foot switch of one embodiment of the present invention.
Figure 14:
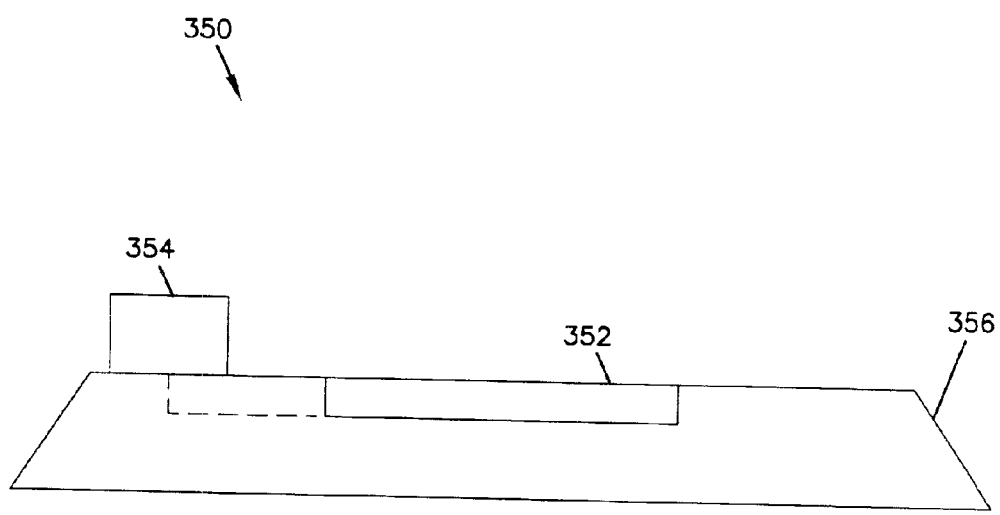
FIG. 14 is a side view of a remote foot switch of one embodiment of the present invention.
Figure 20:
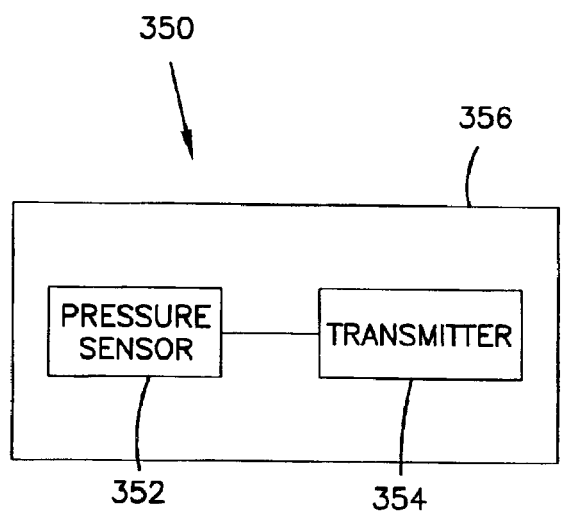
FIG. 20 is a diagram depicting a remote foot switch present in one embodiment of the present invention.
Figure 21:
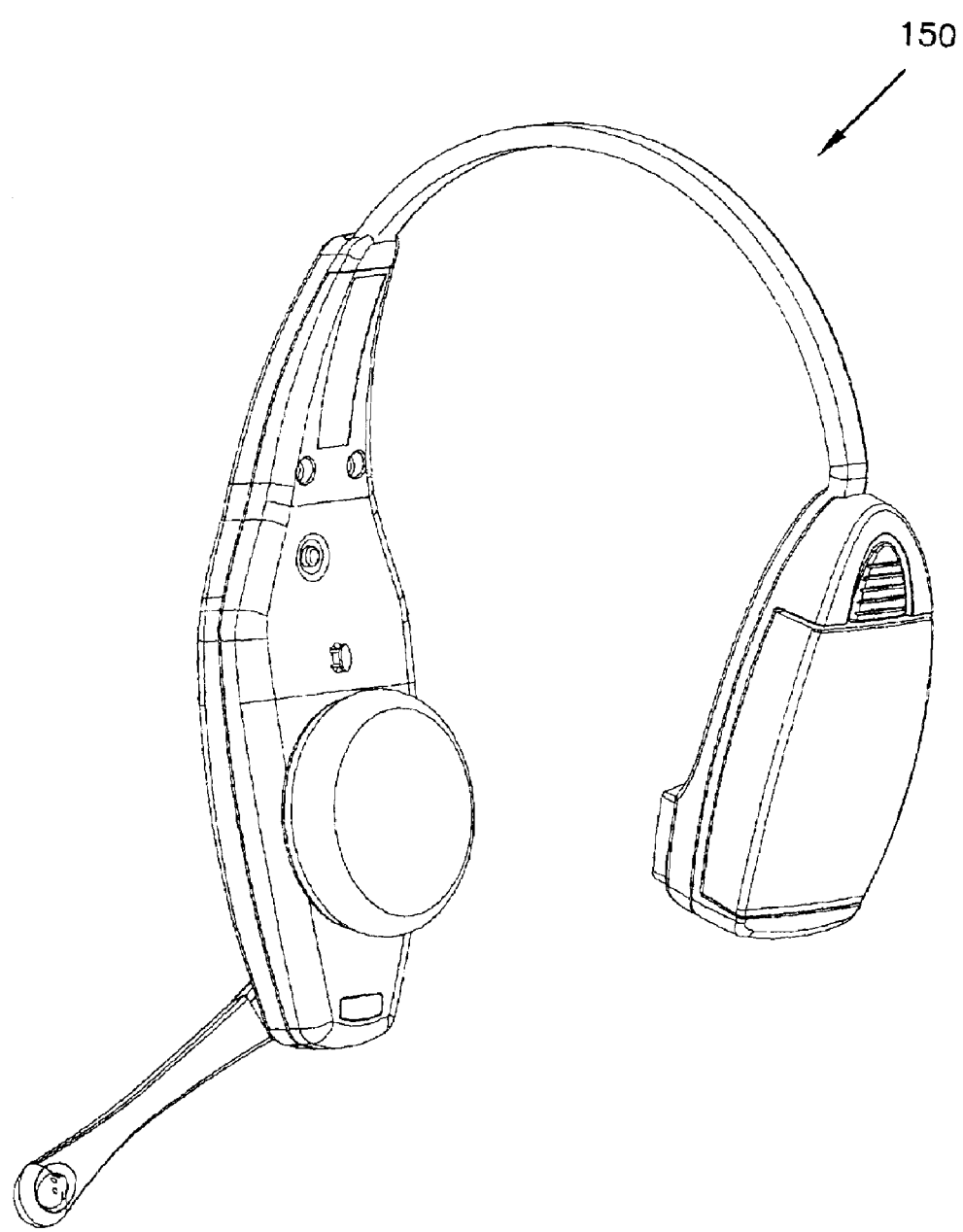
FIG. 21 is a perspective view of a headset present in one embodiment of the present invention.

One embodiment of the wireless intercom system includes a remote foot switch 350 illustrated in FIGS. 13 and 14. The remote foot switch 350 includes a housing containing at least one pressure sensor 352 located inside or on the surface of the housing and a foot switch radio frequency transmitter 354 for transmitting a radio frequency within a foot switch radio frequency range. The pressure sensor and foot switch radio frequency transmitter are located inside the housing 356 of the foot switch, and are depicted in a block diagram of the foot switch in FIG. 20. The remote foot switch allows a user to activate a function of the intercom by pressing on the pressure sensor. The housing 356 of the remote foot switch 350 is preferably configured to deform in some way when under pressure, so that the pressure sensor 352 is activated. The foot switch 350 may be a part of the intercom system 1100, as shown in FIG. 19. When pressure is applied to the pressure sensor 352 of the foot switch, the radio frequency transmitter 354 sends a signal to the intercom 1104. The wireless intercom system can be configured so the signal acts as the TALK1 function, the TALK2 function, or any other designated function. It is also possible to have more than one remote foot switch communicating with the same intercom 1104. It is also possible to have more than one pressure sensor within a single remote foot switch. In this case, each pressure signal activates a transmission at a different frequency and controls a different function. It is also possible to control multiple functions with multiple pressure sensors transmitting within a single frequency range by using a coding system. In this case, each pressure sensor generates a different code transmitted within the same frequency range. The wireless intercom 1104 may be configured to decode the signal to determine which function is intended.

In another embodiment, the foot switch communicates with the intercom via wiring rather than via radio frequency signals. In this embodiment, the foot switch is connected to the intercom via a cable connected to the intercom at connection point 999 depicted in FIGS. 5 and 17.

When the intercom 1104 of FIG. 19 and FIG. 23 is used with a foot switch 350, the intercom 1104 includes a foot switch receiver 1106. The intercom system 1100 may include a remote earpiece 130, a remote foot switch 350 or both, associated with each intercom 1104. The components of the system 1100 determine how many components are needed in the intercom 1104. For example, if the system 1100 includes a remote earpiece 130 and does not include a remote foot switch 350, then the intercom 1104 will include an earpiece transceiver 1105 but no foot switch receiver 1106. Alternatively, if the intercom system 1100 includes a foot switch 350 but no earpiece 130, then the intercom 1104 will include a foot switch receiver 1106 but no earpiece transceiver 1105. If multiple foot switches 350 are included in intercom system 1100, then multiple foot switch receivers 1106 will be included in the intercom 1104.

Figure 15:
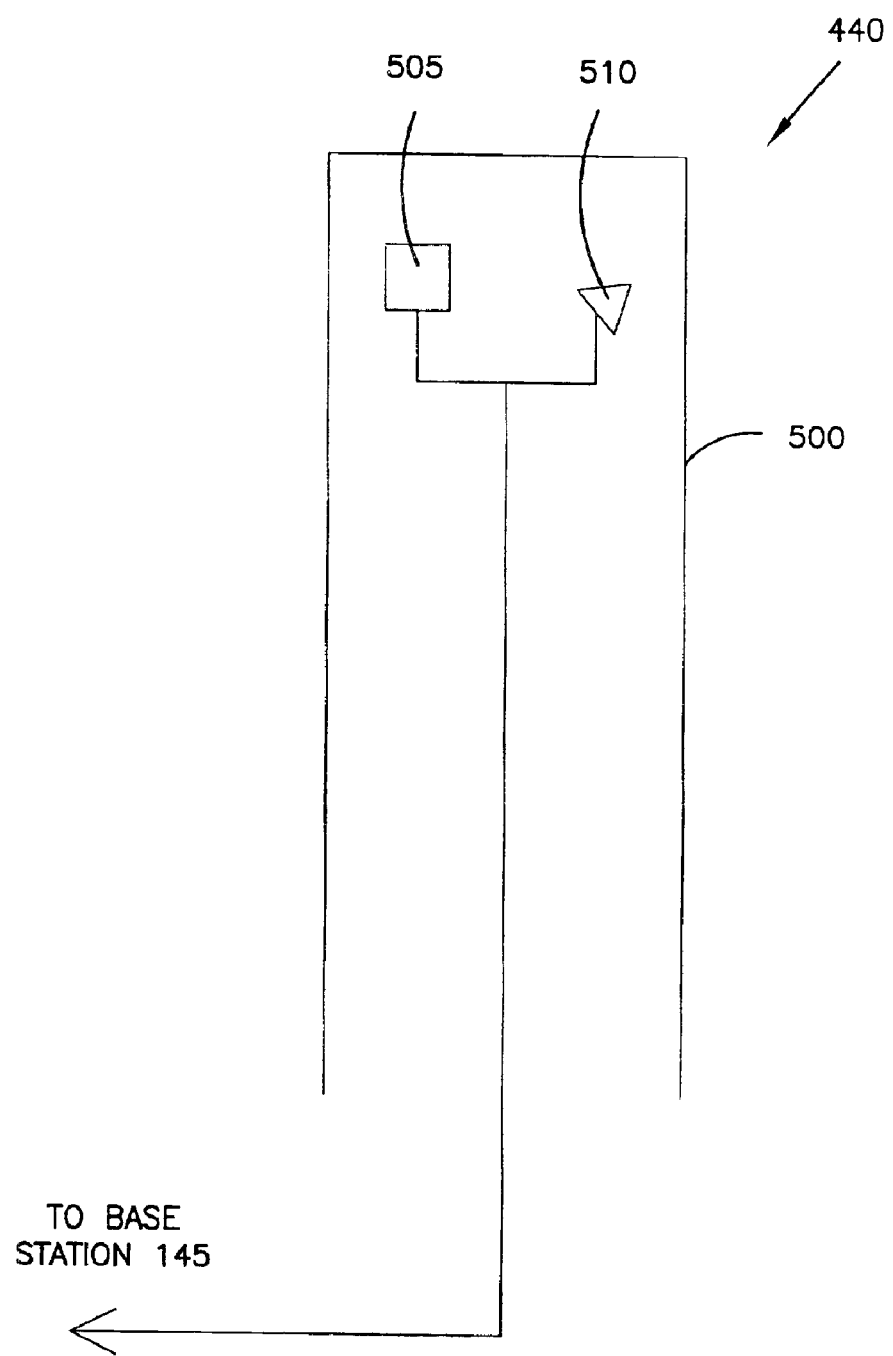
FIG. 15 is a diagram of a speaker post of one embodiment of the present invention.

The wireless intercom system 172 or 1100 may include at least one remote speaker post 440. In one embodiment of a speaker post illustrated in FIG. 15, this remote speaker post 440 includes a post support structure 500, a microphone 505, and a speaker 510. The speaker post is connected via communication wiring to the base station. This configuration is useful in the drive-through lane of a bank or fast food restaurant. In another configuration, the microphone 505 and speaker 510 are mounted on a wall rather than on a post. This configuration would be more common at the gas pump of a convenience store.

FIG. 19 illustrates one of the many various embodiments of a remote wireless intercom system. In this embodiment, an intercom 1104 communicates via radio waves with a remote earpiece 130, a foot switch 350, and a base station 145. The base station 145 may communicate via radio waves with a headset 150. The base station 145 may communicate with the speaker post intercom 440 via wiring.

The various embodiments described above are provided by way of illustration only and should not be construed to limit the invention. Those skilled in the art will ready recognize various modifications and changes which may be made to the present invention without strictly following the exemplary embodiments and applications illustrated and described herein and without departing from the true spirit and scope of the present invention which is set forth in the following claims.

What is claimed is:

1. A wireless intercom system comprising:
 a wireless intercom unit comprising:
 (a) an electronics housing including a first side, wherein the first side is configured to interface with a planar surface;
 (b) a microphone configured to receive an audio signal input, said microphone located on a portion of the housing other than the first side;
 (c) a speaker configured to broadcast an audio signal output, said speaker located on a portion of the housing other than the first side;
 (d) a first intercom transceiver for a first radio frequency range operably connected to the microphone and the speaker; and
 (e) an input device located on a portion of the housing other than the first side;
 (f) a second intercom transceiver for a second radio frequency range;
 (g) a third intercom transceiver for an additional radio frequency range, wherein the input device is a channel control input device configured to select the first or third intercom transceiver; and
 a base station that communicates with the wireless intercom unit via radio waves;
 a speaker post that communicates with the base station via radio waves;
 an earpiece configured to be worn on a ear of a user, the earpiece comprising an earpiece speaker, an earpiece microphone; and an earpiece transceiver for transmitting and receiving radio waves in a second radio frequency range.

2. The wireless intercom system of claim 1 wherein the electronics housing includes a second side wherein the second side is configured to face a user when the wireless intercom unit is resting on the first side, wherein the microphone and input device are located on the second side.

3. The wireless intercom system of claim 2 wherein the speaker is located on the second side.

4. The wireless intercom system of claim 1 wherein said first side is substantially flat.

5. The wireless intercom system of claim 1 wherein said first side comprises a supporting structure to support the wireless intercom unit when it is set on a planar surface.

6. The wireless intercom system of claim 5 wherein the supporting structure comprises four posts on the first side.

7. The wireless intercom system of claim 1 wherein the wireless intercom unit further comprises a bracket attached to said first side configured to be mounted on a substantially vertical planar surface.

8. The wireless intercom system of claim 1 wherein the input device is selected from a group of a power control input device, a volume control input device, channel control input device and a page mode input device.

9. The wireless intercom system of claim 1, wherein the microphone comprises an elongated neck to support the microphone above the electronics housing.

10. The wireless intercom system of claim 1 wherein the earpiece further comprises a curved structure configured to fit around the back side of the outer ear of a user, wherein the earpiece speaker is connected to the curved structure and is configured to rest proximate the outer ear of the user, wherein the earpiece microphone is connected to the earpiece speaker and is configured to be in close proximity to the mouth of the user.

11. A wireless intercom system comprising:

a wireless intercom unit comprising:

(a) an electronics housing including a first side, wherein the first side is configured to interface with a planar surface;

(b) a microphone configured to receive an audio signal input, said microphone located on a portion of the housing other than the first side;

(c) a speaker configured to broadcast an audio signal output, said speaker located on a portion of the housing other than the first side.

(d) a first intercom transceiver for a first radio frequency range operably connected to the microphone and the speaker; and (e) an input device located on a portion of the housing other than first side (f) a second intercom transceiver for a second radio frequency range;

(g) an auxiliary receiver for receiving radio waves in the third radio frequency range;

a base station that communicates with the wireless intercom unit via radio waves;

a speaker post that communicates with the base station via radio waves; an earpiece configured to be worn on an ear of a user, the earpiece comprising an earpiece speaker, an earpiece microphone, and an earpiece transceiver for transmitting and receiving radio waves in the second radio frequency range; and a switch comprising:
(a) a switch housing;
(b) at least one pressure sensor located inside or on the surface of the switch housing; and
(c) a radio frequency transmitter for transmitting radio waves in a third radio frequency range.

* * * * *

UNITED STATES PATENT AND TRADEMARK OFFICE
CERTIFICATE OF CORRECTION

PATENT NO. : 7,103,392 B2  Page 1 of 1
APPLICATION NO. : 10/050308
DATED : September 5, 2006
INVENTOR(S) : Douglas D. Fletcher It is certified that error appears in the above-identified patent and that said Letters Patent is hereby corrected as shown below:

Page 3,
Col. 1 (Other Publications), Line 2, Delete "publ" and insert -- publ.--, therefor.
Col. 2 (Other Publications), Line 2, Delete "rev" and insert -- Rev. --, therefor.
Col. 2 (Other Publications), Line 5, Delete "Rev" and insert -- Rev. --, therefor.

Column 11,
Line 9, in Claim 8, after "device," insert -- a --.

Column 12,
Line 3, In Claim 11, after "side" delete "." and insert -- ; --, therefor.
Line 9, In Claim 11, after "than" insert -- the --.
Line 9, In Claim 11, after "side" insert -- ; --.

Signed and Sealed this

Nineteenth Day of December, 2006

JON W. DUDAS
*Director of the United States Patent and Trademark Office*